US008027869B2

(12) United States Patent
Chang et al.

(10) Patent No.: US 8,027,869 B2
(45) Date of Patent: Sep. 27, 2011

(54) METHOD AND SYSTEM FOR MONITORING ACHIEVEMENT AND ATTAINMENT AND CALCULATING COMPENSATION VIA TIME-BASED ORGANIZATION HIERARCHIES

(75) Inventors: Daniel T. Chang, Belmont, CA (US); Pasan Rukmal Sirisena, San Mateo, CA (US); Xin Wang, Sunnyvale, CA (US); Tao Gui, Foster City, CA (US); Charles Shagong, Menlo Park, CA (US); Alexander Goldstein, Foster City, CA (US); Steve Apfelberg, Menlo Park, CA (US); Marc Verbeek, Foster City, CA (US); Tarri Furlong, San Leandro, CA (US); Ashley Stirrup, Burlingame, CA (US); Ajay Sabhlok, Fremont, CA (US); Martin Renaud, San Carlos, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1475 days.

(21) Appl. No.: 10/273,632

(22) Filed: Oct. 18, 2002

(65) Prior Publication Data
US 2007/0226026 A1 Sep. 27, 2007

Related U.S. Application Data

(60) Provisional application No. 60/333,433, filed on Nov. 27, 2001.

(51) Int. Cl.
*G06Q 10/00* (2006.01)
(52) U.S. Cl. ............... 705/7.38; 705/7.12; 705/7.15; 707/999.1
(58) Field of Classification Search ............. 705/7.12, 705/7.15, 7.38; 707/999.1
See application file for complete search history.

(56) References Cited

U.S. PATENT DOCUMENTS

| 5,386,557 | A | * | 1/1995 | Boykin et al. | 707/1 |
| 5,878,400 | A | * | 3/1999 | Carter, III | 705/20 |
| 5,924,077 | A | | 7/1999 | Beach et al. | 705/10 |
| 6,023,703 | A | * | 2/2000 | Hill | 707/100 |
| 6,067,531 | A | * | 5/2000 | Hoyt et al. | 705/35 |
| 6,105,001 | A | * | 8/2000 | Masi et al. | 705/14 |

(Continued)

OTHER PUBLICATIONS

Colletti et al. Compensating New Sales Roles: How to Design Rewards That Work in Today's Selling Environment, Second Edition, May 2001, AMACOM, p. 90.

*Primary Examiner* — Beth V Boswell
*Assistant Examiner* — Tiphany B Dickerson
(74) *Attorney, Agent, or Firm* — Campbell Stephenson LLP

(57) ABSTRACT

A method, system, and article of manufacture for defining and managing instances of time-based organization hierarchies, and for monitoring achievement and attainment, and calculating compensation for individuals and/or groups within instances of the time-based organization hierarchies are disclosed herein. In one embodiment, a user may define and/or manage one or more instances of the time-based organization hierarchy via a user interface generated on a client. Moreover, and in response to a sales data input corresponding to a transaction, an achievement and attainment monitoring process may then be executed to accumulate transaction data in one or more achievement containers, and to compile achievement containers from a specified attainment period to calculate a user's attainment. In addition, an embodiment also provides for implementation of a compensation calculation process that may utilize the transaction data accumulated in the achievement containers to calculate an individual's compensation for a specified compensation period.

44 Claims, 12 Drawing Sheets

U.S. PATENT DOCUMENTS

| | | | |
|---|---|---|---|
| 6,134,533 A * | 10/2000 | Shell | 705/26 |
| 6,360,188 B1 * | 3/2002 | Freidman et al. | 703/1 |
| 6,405,207 B1 | 6/2002 | Petculescu et al. | 707/102 |
| 6,415,298 B1 * | 7/2002 | Oesterer et al. | 1/1 |
| 6,421,648 B1 * | 7/2002 | Gagnon et al. | 705/1 |
| 6,601,048 B1 | 7/2003 | Gavan et al. | 706/10 |
| 6,618,706 B1 * | 9/2003 | Rive et al. | 705/30 |
| 6,625,602 B1 * | 9/2003 | Meredith et al. | 707/8 |
| 6,662,164 B1 * | 12/2003 | Koppelman et al. | 705/14 |
| 6,691,093 B2 * | 2/2004 | Shell | 705/26 |
| 6,947,946 B2 * | 9/2005 | Nishikawa | 1/1 |
| 6,947,951 B1 * | 9/2005 | Gill | 707/104.1 |
| 7,149,707 B2 * | 12/2006 | Scoble | 705/14 |
| 7,644,009 B2 * | 1/2010 | Amerasinghe et al. | 705/7.31 |
| 2001/0049622 A1 * | 12/2001 | Gozdeck et al. | 705/11 |
| 2002/0091649 A1 * | 7/2002 | Anvekar et al. | 705/72 |
| 2002/0169678 A1 * | 11/2002 | Chao et al. | 705/26 |
| 2003/0028443 A1 * | 2/2003 | Ellis et al. | 705/26 |
| 2005/0010550 A1 | 1/2005 | Potter et al. | 707/1 |
| 2007/0226025 A1 | 9/2007 | Chang et al. | 705/8 |
| 2007/0226027 A1 | 9/2007 | Chang et al. | 705/8 |

* cited by examiner

FIG. 7A

Quota Seasonality Skew (723)

| NAME | MEASURE PERIOD |
|---|---|
| HI-TECH SEASONALITY | QUARTER |

727 — NEW

Skew Entries (725) — 729 SAVE

| PERIOD | PERIOD % | PERIOD FAC. AMT. | PERIOD FAC. QTY. |
|---|---|---|---|
| Q1 2003 | 15% | | |
| Q2 2003 | 20% | | |
| Q3 2003 | 25% | | |
| Q4 2003 | 40% | | |

Tree (403):
- Organizations
  - US
    - Territories
      - US Territory
        - Positions
          - Tom
            - Quotas
              - Total Revenue Quota
          - Pete
          - Mary
        - Rules
          - US Rule 001
  - Organizations
    - E
    - W
      - Territories
      - Organizations
        - NW
        - CW
        - SW

Rules (803)

| NAME | STAT. | OBJECT | RULE TYPE | START DATE | END DATE |
|---|---|---|---|---|---|
| US RULE 001 | IN PROG. | ORDERS | NMD. ACT. | 01/01/2003 | 12/31/2003 |

815

Rule

807 — NEW   SAVE — 809

| NAME: | RULE TYPE: |
|---|---|
| US RULE 001 | NAMED ACCT. |
| STATUS: | START DATE: |
| IN PROGRESS | 01/01/2003 |
| OBJECT: | END DATE: |
| ORDERS | 12/31/2003 |

805, 808

801

| ACHIEVEMENT CONTAINER DEFINITIONS ◀ ▶ | | | | | |
|---|---|---|---|---|---|
| NAME | ID | PLAN SELECTION | PLAN SELECTION ACCUMULATION PERIOD | EXECUTION SELECTION | EXECUTION SELECTION ACCUMULATION PERIOD |
| PROD. REVENUE | 101 | BOOKED | DAILY | BOOKED | MONTHLY |
| PROD. REVENUE | 103 | BOOKED | DAILY | INVOICED | MONTHLY |
| PROD. REVENUE | 105 | INVOICED | DAILY | INVOICED | MONTHLY |
| PROD. REVENUE | 107 | BOOKED | DAILY | SHIPPED | MONTHLY |
| | | | | | |

ACHIEVEMENT CONTAINER DEFINITION

[NEW] [SAVE] [CANCEL]

| NAME: | ID: | UNIT MEASURE: | ORG. HIERARCHY: |
|---|---|---|---|
| PROD. REVENUE | 103 | REVENUE | US - DIRECT |
| PLAN SELECTION: | EXECUTION SELECTION: | REVENUE TYPE: | ACCUM CURRNC'Y: |
| BOOKED | INVOICED | PRODUCT | USD |
| P.S. ACCUM. PER.: | E.S. ACCUM. PER.: | ROLL UP ?: | INACTIVE DATE: |
| DAILY | MONTHLY | X | |

*FIG. 11*

| ORDER # | REVENUE TYPE | PLAN DATE | EXEC. DATE | STATUS | AMOUNT | TEAM & CREDIT |
|---|---|---|---|---|---|---|
| 1-2884247 | PRODUCT | 05/05/03 | | BOOKED | $10,000 | TERRY, CE, 100% |
| 1-2884249 | PRODUCT | 05/05/03 | | BOOKED | $8,000 | TERRY, CE, 100% |
| 1-2884268 | PRODUCT | 06/20/03 | | BOOKED | $25,000 | TERRY, CE, 100% |
| 1-2884373 | PRODUCT | 10/15/03 | | BOOKED | $20,000 | TERRY, CE, 100% |

*FIG. 13A*

| ORDER # | REVENUE TYPE | PLAN DATE | EXEC. DATE | STATUS | AMOUNT | TEAM & CREDIT |
|---|---|---|---|---|---|---|
| 1-2884247 | PRODUCT | 05/05/03 | 10/17/03 | INVOICED | $10,000 | TERRY, CE, 100% |
| 1-2884249 | PRODUCT | 05/05/03 | 10/31/03 | INVOICED | $8,000 | TERRY, CE, 100% |
| 1-2884268 | PRODUCT | 06/20/03 | 01/02/04 | INVOICED | $25,000 | TERRY, CE, 100% |
| 1-2884373 | PRODUCT | 10/15/03 | 12/19/03 | INVOICED | $20,000 | TERRY, CE, 100% |

*FIG. 13B*

| ACHIEVEMENT CONTAINER ID | PLAN SELECTION DATE | EXECUTION SELECTION DATE | POSITION | TERRITORY | AMOUNT |
|---|---|---|---|---|---|
| 103 | 05/05/03 | OCT. '03 | TERRY | CE | $18,000 |

TRANSACTIONS (1) AMOUNT: $10,000; ORDER #: 1-2884247
(2) AMOUNT: $8,000; ORDER #: 1-2884249

*FIG. 14A*

| ACHIEVEMENT CONTAINER ID | PLAN SELECTION DATE | EXECUTION SELECTION DATE | POSITION | TERRITORY | AMOUNT |
|---|---|---|---|---|---|
| 103 | 06/20/03 | JAN. '04 | TERRY | CE | $25,000 |

TRANSACTIONS (1) AMOUNT: $25,000; ORDER #: 1-2884268

*FIG. 14B*

| ACHIEVEMENT CONTAINER ID | PLAN SELECTION DATE | EXECUTION SELECTION DATE | POSITION | TERRITORY | AMOUNT |
|---|---|---|---|---|---|
| 103 | 10/15/03 | DEC. '03 | TERRY | CE | $20,000 |

TRANSACTIONS (1) AMOUNT: $20,000; ORDER #: 1-2884373

*FIG. 14C*

| ACHIEVEMENT CONTAINER ID | PLAN SELECTION DATE | EXECUTION SELECTION DATE | POSITION | TERRITORY | AMOUNT |
|---|---|---|---|---|---|
| 103 | 10/15/03 | DEC. '03 | TOM | US | $20,000 + |

TRANSACTIONS (1) AMOUNT: $20,000; ORDER #: 1-2884373
(2) ...

*FIG. 14D*

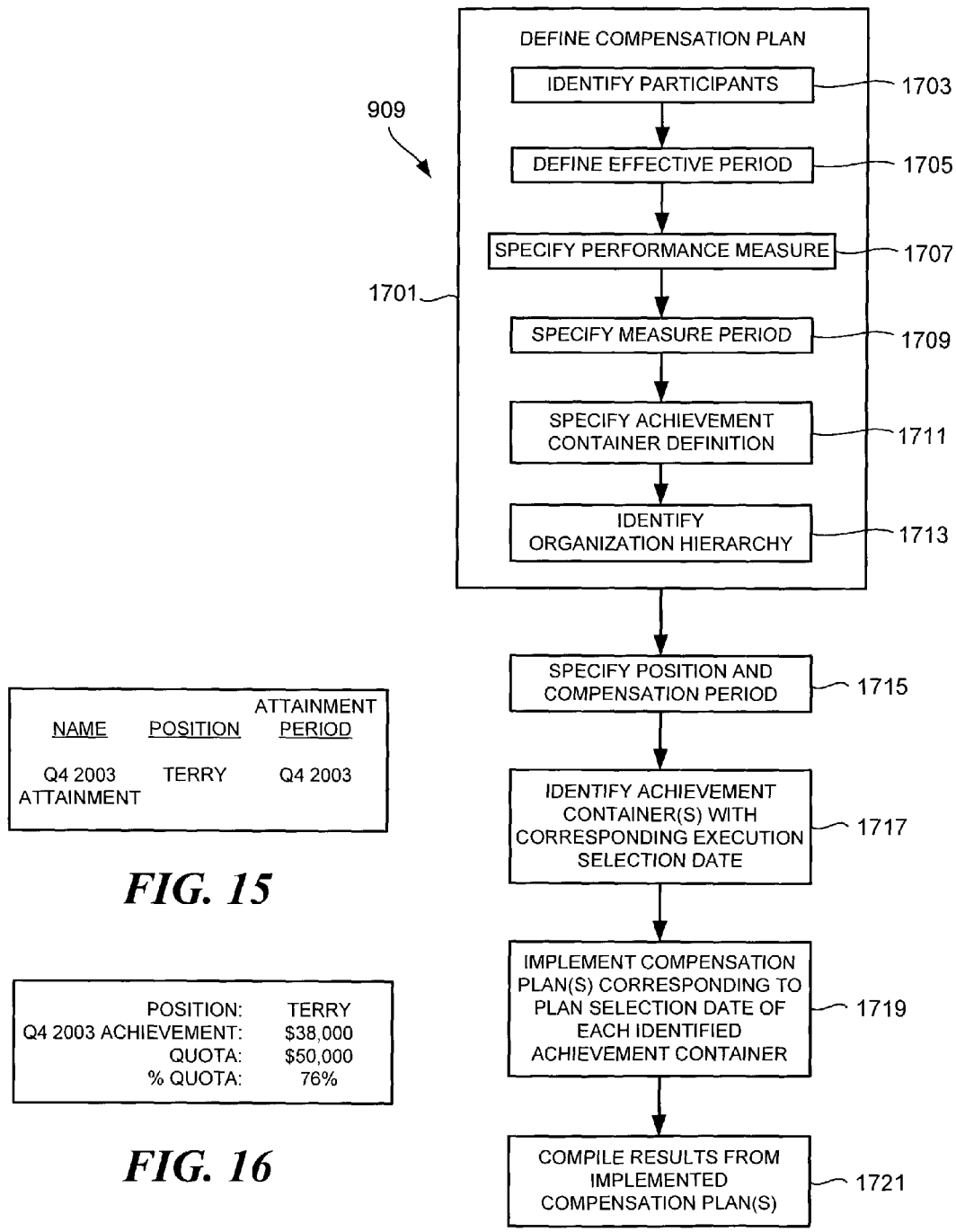

| Q2 2003 PLAN | SALES REP. PLAN |
| --- | --- |
| PARTICIPANTS: | DAVE, SUE, TERRY, ... |
| EFFECTIVE PERIOD: | 04/01/2003 - 06/30/2003 |
| PERFORMANCE MEASURE: | % QUOTA |
| PERIOD: | QUARTER |
| ACHIEVEMENT CONTAINER DEFINITION: | 103 |
| ORGANIZATION HIERARCHY: | US - DIRECT |

*FIG. 18A*

| Q4 2003 PLAN | SALES REP. PLAN |
| --- | --- |
| PARTICIPANTS: | DAVE, SUE, TERRY, ... |
| EFFECTIVE PERIOD: | 10/01/2003 - 12/31/2003 |
| PERFORMANCE MEASURE: | % QUOTA |
| PERIOD: | QUARTER |
| ACHIEVEMENT CONTAINER DEFINITION: | 103 |
| ORGANIZATION HIERARCHY: | US - DIRECT |

*FIG. 18B*

| NAME | POSITION | COMPENSATION PERIOD |
| --- | --- | --- |
| Q4 2003 COMPENSATION | TERRY | Q4 2003 |

*FIG. 19*

| | |
| --- | --- |
| POSITION: | TERRY |
| Q2 2003 PLAN TOTAL: | $18,000 |
| Q2 2003 PLAN COMP.: | $9,000 |
| Q4 2003 PLAN TOTAL: | $20,000 |
| Q4 2003 PLAN COMP.: | $10,000 |
| TOTAL COMPENSATION: | $19,000 |

*FIG. 20*

METHOD AND SYSTEM FOR MONITORING ACHIEVEMENT AND ATTAINMENT AND CALCULATING COMPENSATION VIA TIME-BASED ORGANIZATION HIERARCHIES

CROSS-REFERENCE TO RELATED APPLICATION

This application is related to provisional application Ser. No. 60/333,433, filed Nov. 27, 2001, and titled METHOD AND SYSTEM FOR MONITORING REVENUE ACHIEVEMENT AND ATTAINMENT VIA TIME-BASED ORGANIZATION HIERARCHIES. The benefit of the filing date of the above-identified application is hereby claimed pursuant to 35 U.S.C. §119(e)(1).

TECHNICAL FIELD OF THE INVENTION

This disclosure relates generally to sales-based compensation mechanisms, and more particularly, but not exclusively, to a method, system, and article of manufacture for managing time-based organization hierarchies and monitoring achievement and attainment and calculating compensation via the time-based organization hierarchies.

BACKGROUND INFORMATION

Many large companies compensate employees on a commission basis in relation to sales credited to the employees. Typically, the management structure of these companies is organized as a hierarchy from the company president, for example, to the sales representatives. In order to provide credit for a given sale to multiple individuals, such as the sales representative, the sales manager, and the like, these companies often have complex sales organizations developed to provide matrix coverage, or territories wherein multiple people or groups of people receive credit on a single sale. For example, sales credit may be distributed to multiple individuals by adding everyone who is to be compensated for a transaction to a sales team (e.g., adding managers into the sales team with the sales representatives), or to a compensation group. However, as the complexity of the management structure increases, so to does the administration of these sales organizations.

In addition, sales organizations developed from the current hierarchical management structure generally allow sales credit to be assigned, and compensation to be calculated, only for the latest instance of a particular sales model. As changes occur in the management structure of the company (e.g., reorganization or personnel changes), the complexity of properly assigning sales credit and calculating compensation becomes increasingly complex and administratively burdensome.

SUMMARY OF THE ILLUSTRATED EMBODIMENTS

An aspect of the illustrated embodiments is to provide a method, system, and article of manufacture for defining and managing instances of time-based organization hierarchies, and for monitoring achievement and attainment, and calculating compensation for individuals and/or groups within instances of the time-based organization hierarchies. In one embodiment, a user may define and/or manage one or more instances of the time-based organization hierarchy via a user interface generated on a client. Moreover, and in response to a sales data input corresponding to a transaction, an achievement and attainment monitoring process may then be executed to accumulate transaction data in one or more achievement containers, and to compile achievement containers from a specified attainment period to calculate a user's attainment. In addition, an embodiment also provides for implementation of a compensation calculation process that may utilize the transaction data accumulated in the achievement containers to calculate an individual's compensation for a specified compensation period.

BRIEF DESCRIPTION OF THE VARIOUS VIEWS OF THE DRAWINGS

In the drawings, like reference numerals refer to like parts throughout the various views of the non-limiting and non-exhaustive embodiments of the present invention, and wherein:

FIG. 7A is an illustration of an example screen display showing an embodiment of a UI display configured to define and manage seasonality skews of an example organization hierarchy in accordance with an embodiment of the present invention;

Figure 8A:
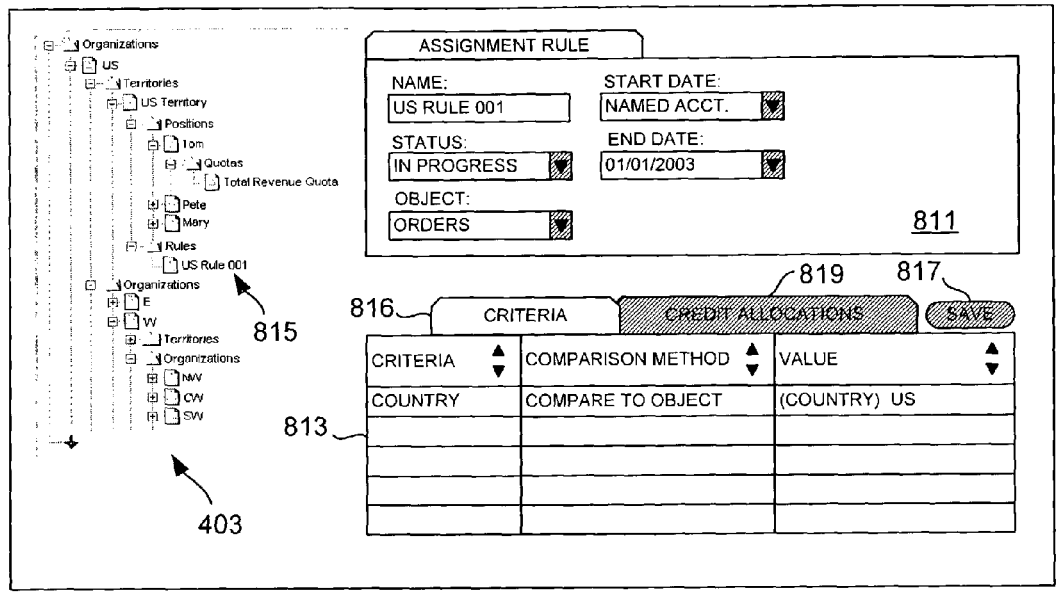
Figure 8B:
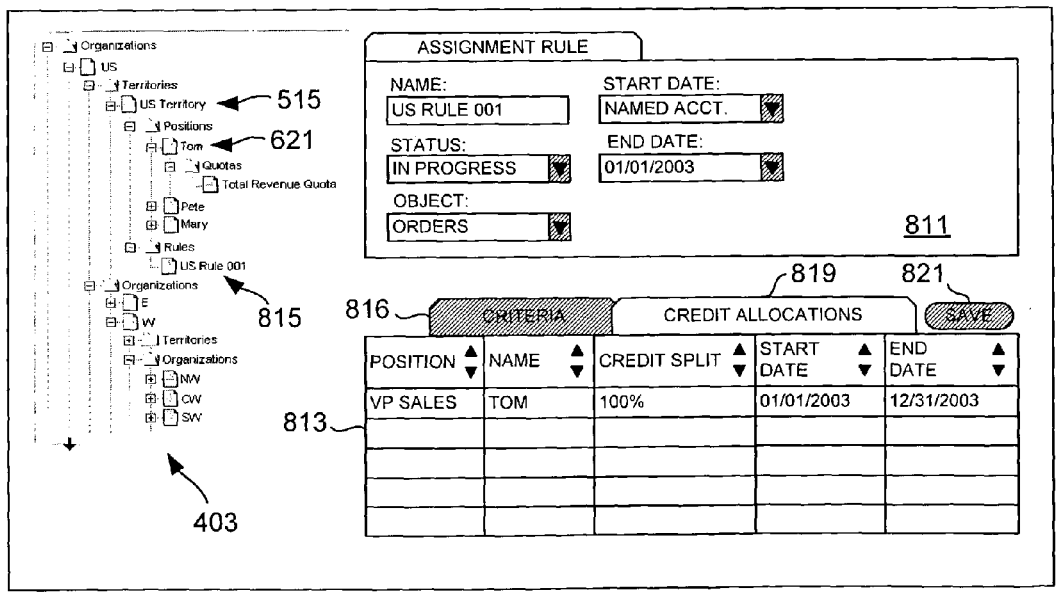
Figures 9, 10:
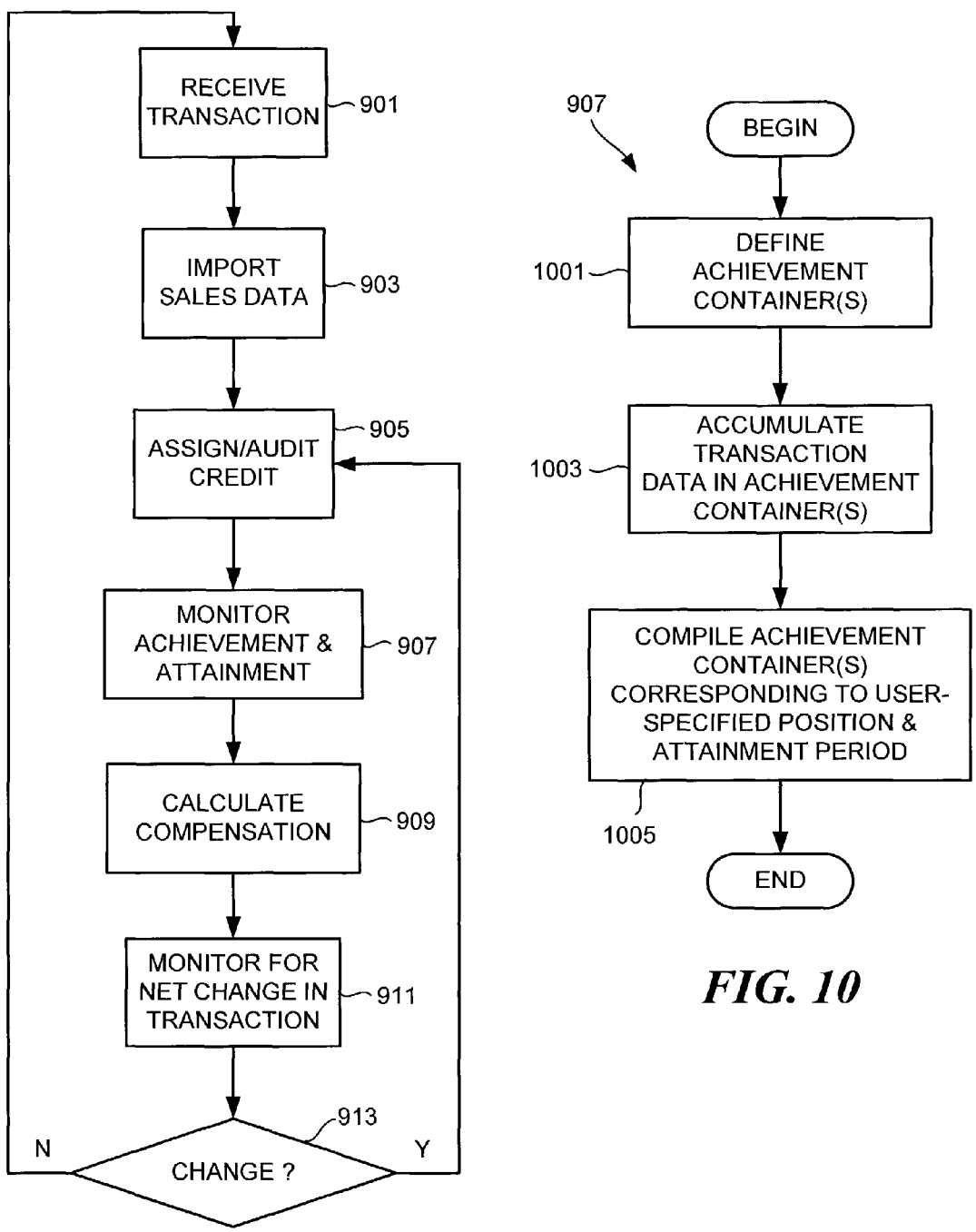
Figure 12:
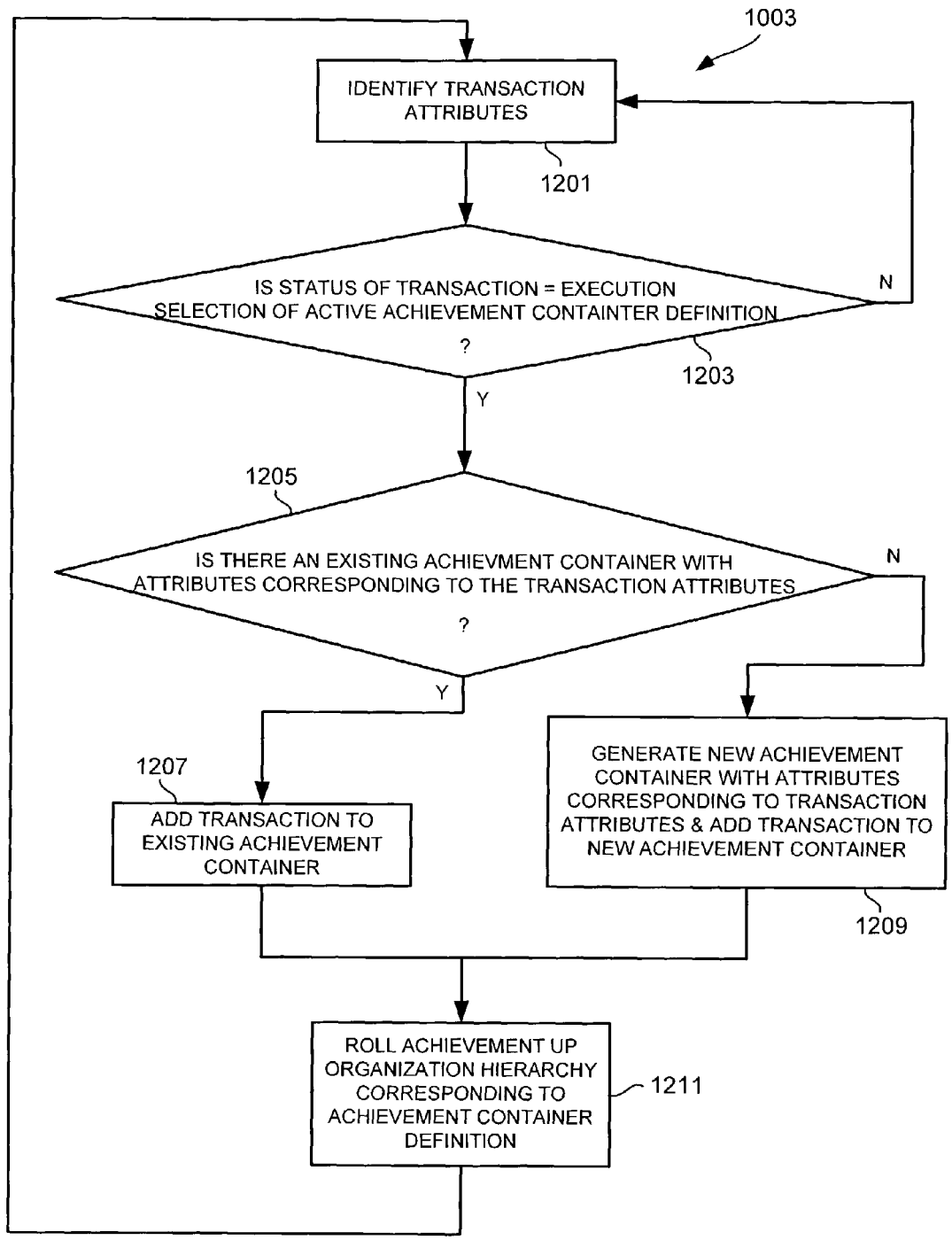

FIGS. 8, 8A, and 8B are illustrations of example screen displays showing embodiments of UI displays configured to define and manage rules of an example organization hierarchy in accordance with an embodiment of the present invention;

FIG. 9 is a flow diagram illustrating an embodiment of a flow of events in an example sales-based compensation process in accordance with an embodiment of the present invention;

FIG. 10 is a flow diagram illustrating an embodiment of a flow of events in an example achievement and attainment monitoring process in accordance with an embodiment of the present invention;

FIG. 11 is an illustration of an example screen display showing an embodiment of a UI display configured to define and manage achievement container definitions in accordance with an embodiment of the present invention;

FIG. 12 is a flow diagram illustrating an embodiment of a flow of events in an example transaction data accumulation process in accordance with an embodiment of the present invention;

FIGS. 13A-13B are illustrations of an embodiment of a data structure including a plurality of example transactions and corresponding transaction attributes in accordance with an embodiment of the present invention;

FIGS. 14A-14D are illustrations of example achievement containers in accordance with an embodiment of the present invention;

FIG. 15 is an illustration of example attainment run criteria in accordance with an embodiment of the present invention;

FIG. 16 is an illustration of an example result produced from the example attainment run criteria of FIG. 15 in conjunction with the example achievement containers illustrated in FIGS. 14A-14D;

FIG. 17 is a flow diagram illustrating an embodiment of a flow of events in an example compensation calculation process in accordance with an embodiment of the present invention;

FIGS. 18A-18B are illustrations of example compensation plans in accordance with an embodiment of the present invention;

FIG. 19 is an illustration of example compensation run criteria in accordance with an embodiment of the present invention; and FIG. 20 is an illustration of an example result produced from the example compensation run criteria of FIG. 19 in conjunction with the example compensation plans of FIGS. 18A-18B and the example achievement containers illustrated in FIGS. 14A-14D.

DETAILED DESCRIPTION OF THE ILLUSTRATED EMBODIMENTS

Embodiments of a method, system, and article of manufacture for defining and managing time-based organization hierarchies, and for monitoring achievement and attainment, and calculating compensation for individuals and/or groups within instances of the time-based organization hierarchies are described in detail herein. In the following description, numerous specific details are provided, such as the identification of various system components, to provide a thorough understanding of embodiments of the invention. One skilled in the art will recognize, however, that embodiments of the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, embodiments of the invention provide a method, system, and article of manufacture to define and manage instances of time-based organization hierarchies (also referred to as "sales hierarchies"), and to monitor achievement, and calculate compensation for positions within the time-based organization hierarchies in response to a sales data input corresponding to one or more transactions. In one representative example, an embodiment of a UI, implemented via a network system in accordance with an embodiment of the present invention, may include a plurality of UI displays configured to define and/or manage one or more instances of a time-based organization hierarchy (also "organization hierarchy") via user input. For example, the user may define an instance of the time-based organization hierarchy to include a plurality of nodes, each corresponding to a defined territory. In various embodiments, the territories may correspond to a geographical area, to an industry sector, or the like. The user may also define a position to correspond to each territory for which sales credit may be assigned, achievement may be monitored, and compensation may be calculated, in response to a sales data input corresponding to a transaction.

For example, the instance of the time-based organization hierarchy may comprise a pyramid structure including a company president position corresponding to a node at an upper-most level (e.g., a "root node" or "primary node"), followed by a pair of sales manager positions corresponding to a pair of nodes at a middle level (e.g., "secondary nodes"), and a plurality of sales representative positions corresponding to a plurality of nodes at a lower-most level (e.g., "tertiary nodes") of the organization hierarchy. When the transaction (e.g., sale of a product/service) occurs, the sales data input (e.g., corresponding to data, including an order date, amount, quantity, location, and the like) may be processed to assign sales credit to the lower-most node from which the transaction originated. Moreover, a corresponding sales credit may then be rolled-up to each successive parent node in the organization hierarchy until the root node (e.g., the primary node) is reached.

The time-based organization hierarchy may also be defined, in an embodiment, to correspond to a sales model (e.g., direct sales), and to have an effective period. The effective period may be defined by a start date and an end date. In this manner, multiple instances of the time-based organization hierarchy, each with an entirely distinct effective period, may be defined with minor variations (e.g., related to personnel changes, organization structure changes, or the like) to permit sales credit to be assigned, and attainment and/or compensation calculated, for any one or more of the positions with regard to any one corresponding time period. By maintaining instances of the time-based organization hierarchy corresponding to different calendar periods (e.g., via storage in a memory), retroactive calculations may be made to reflect adjustments in sales data (e.g., changes to an order) that occur after the corresponding organization hierarchy has been made obsolete by an updated instance. In one embodiment, efficient storage of a plurality of instances of an organization hierarchy may include storing revisions made to successive versions of the hierarchy. Other features of the illustrated embodiments will be apparent to the reader from the foregoing and the appended claims, and as the detailed description and discussion is read in conjunction with the accompanying drawings.

Figure 1:
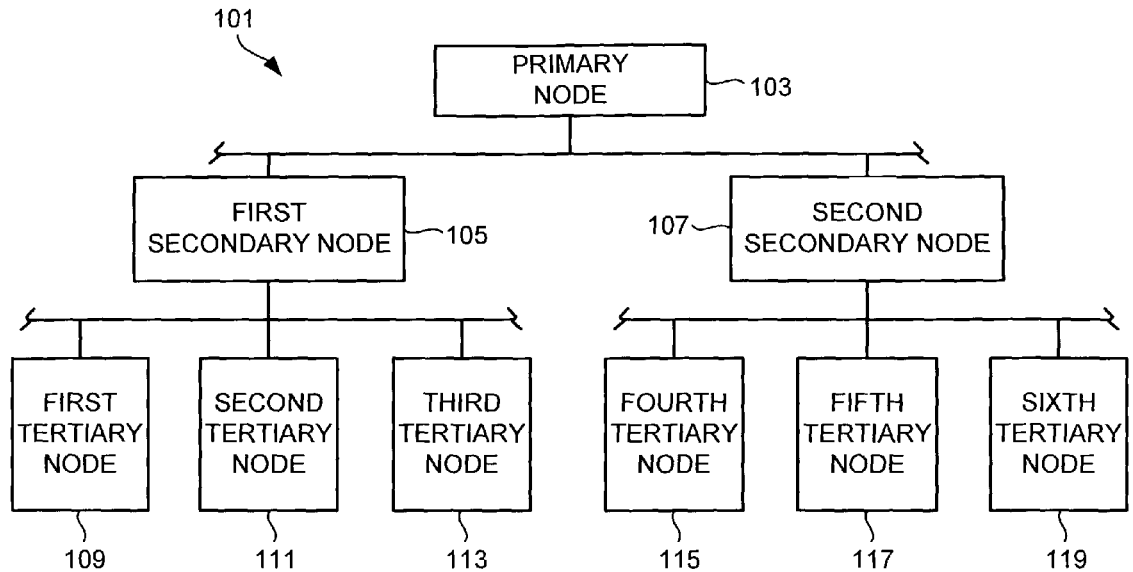
FIG. 1 is a pictorial illustration of an example organization hierarchy in accordance with an embodiment of the present invention.

With reference now to the drawings, and in particular to FIG. 1, an embodiment of a time-based organization hierarchy 101 is illustrated in accordance with an embodiment of the present invention. In the illustrated embodiment, the time-based organization hierarchy 101 includes a primary node 103 (e.g., the root node) at an upper-most level of the hierarchy. At a level directly below the primary node 103 are a first secondary node 105 and a second secondary node 107. In turn, at a level directly below the first secondary node 103 are a first tertiary node 109, a second tertiary node 111, and a third tertiary node 113. Similarly, directly below the second secondary node 105 are a fourth tertiary node 115, a fifth tertiary node 117, and a sixth tertiary node 119. It will be appreciated that the organization hierarchy 101 illustrated in FIG. 1 and described herein is intended only as an example. Additional nodes may be included at each level of the hierarchy, and/or additional levels may also be included in the organization hierarchy 101 in embodiments in accordance with an embodiment of the present invention.

In one embodiment, each of the nodes 103-119 of the time-based organization hierarchy 101 may correspond to a defined territory. Each territory may be defined, for example, to correspond to a geographical area such as the United States, or parts thereof, or to an industry sector, such as telecommunications, banking, automotive, or the like, or to parts thereof. For instance, the primary node 103 may be defined to correspond to a territory encompassing the geographical area of the entire United States. Furthermore, the first secondary node 105 may be defined to correspond to the western United States, while the second secondary node 107 may be defined to correspond to the eastern United States (e.g., the geographical area east of the Mississippi River). In turn, each of the tertiary nodes 109-119 of the time-based organization hierarchy 101 illustrated in FIG. 1 may further subdivide the geographical area, for example, corresponding to the node (e.g., the secondary nodes 105 and 107) from which they stem in the organization hierarchy 101. For example, the tertiary nodes 109-119 may correspond to a northwest, centerwest, southwest, northeast, centereast, and southeast territory, respectively, each corresponding to a group of states, in an embodiment. It will be appreciated that nodes associated with additional levels of the organization hierarchy 101 may further subdivide the geographical area, for example, into smaller and smaller parts in various embodiments. In one embodiment, each node (e.g., the nodes 103-119) may correspond to a unique territory (only one node in the instance of the organization hierarchy corresponds to that territory), as will be discussed in greater detail hereinafter.

It will be appreciated that methodologies in accordance with an embodiment of the present invention described herein may be embodied as a set of machine-readable instructions capable of implementation by a computer or other device, in an embodiment. As used herein, the term "machine-readable medium" shall be taken to include any medium that is capable of storing data, information, or encoding a sequence of instructions or operations for execution by a processor to cause the performance of the methodologies of embodiments of the present invention. The term "machine-readable medium" shall be understood to include, for example, solid-state memories, read-only memory components, random-access memory components, magnetic disk storage media, optical storage media, flash memory devices, electrical, optical, or other form of propagated signals (e.g., carrier tones, infrared signals, and digital signals), and the like.

Figure 2:
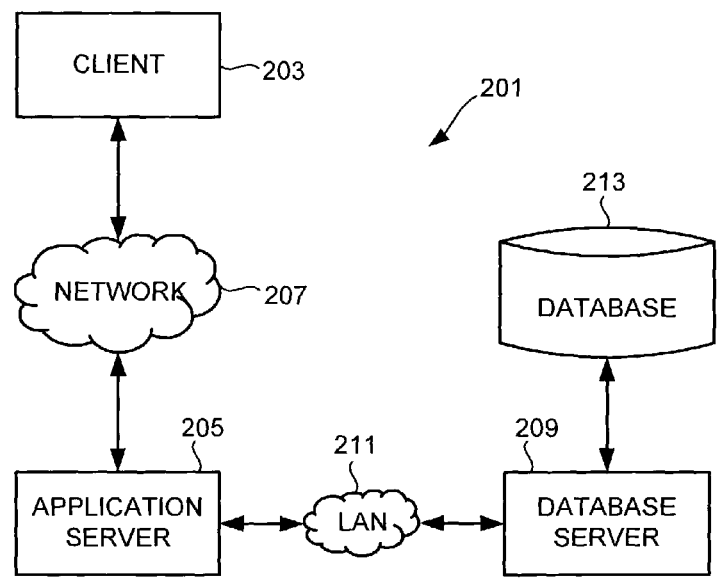
FIG. 2 is a block diagram illustrating an embodiment of a network system in accordance with an embodiment of the present invention.

In one embodiment, the methodologies of embodiments of the present invention may be implemented via a graphical UI generated by a client, such as a computer system, or the like. For example, FIG. 2 is a block diagram illustration of an embodiment of a network system 201 in which methodologies in accordance with an embodiment of the present invention may be implemented. In the illustrated embodiment, the network system 201 includes a client 203 communicatively coupled to an application server 205 via a network 207. The application server 205 may in turn be communicatively coupled to a database server 209 via a local area network ("LAN") 211, or the like, to facilitate the storage of data in, and/or retrieval of data from, a database 213, in an embodiment. In one instance the database 213 may comprise a relational database management system database. The network 207 may comprise any one of a number of network links, such as for example, but not limited to, the Internet, a wide area network ("WAN"), a LAN, an intranet, or the like, and may include physical connections such as wires, cables, optical fibers, or the like, and/or transceivers capable to receive and/or transmit wireless communications (e.g., transmitted through the atmosphere), in various embodiments.

In one embodiment, the UI may be communicated to the client 203, from the application server 205, as a series of hypertext markup language ("HTML") documents capable of being processed in conjunction with a browser application executable by the client 203. The communication of the UI from the application server 205 to the client may be facilitated by a communication protocol such as hypertext transfer protocol ("HTTP"), or other suitable communication protocol, in an embodiment. The UI may include, in an embodiment, a plurality of UI displays configured to receive a user input to define one or more instances of a time-based organization hierarchy (e.g., the organization hierarchy 101, FIG. 1) in accordance with an embodiment of the present invention, as will be discussed in greater detail hereinafter. In addition, embodiments of the present invention may allow the user to track historical transactions, quotas, and/or territories to facilitate retroactive calculations in response to adjustments of sales data inputs. It will be appreciated that in one embodiment of the invention, the methodologies may be implemented via a distributed processing environment including multiple clients and/or servers.

Figure 3:
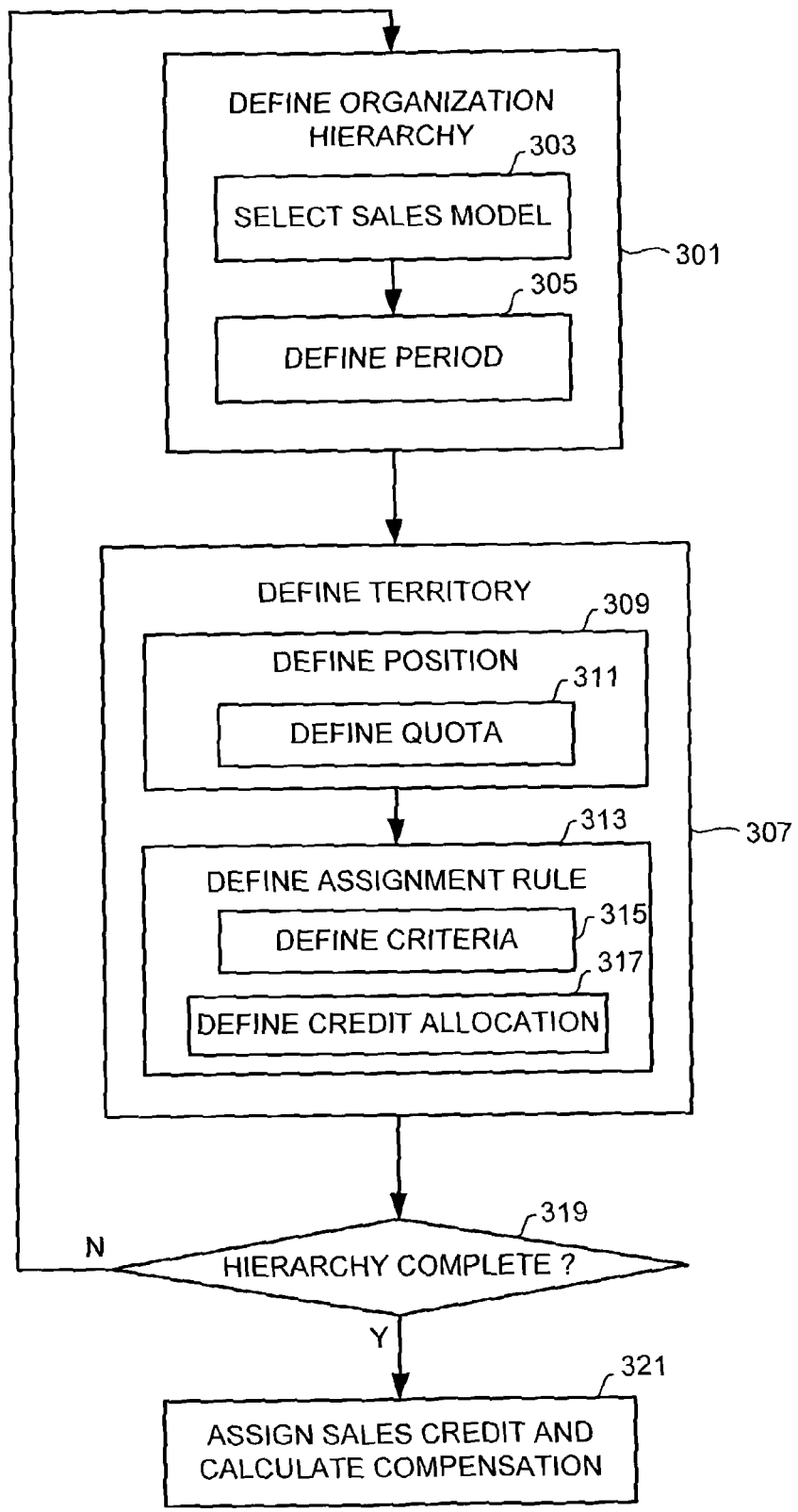
FIG. 3 is a flow diagram illustrating an embodiment of a flow of events in an example definition process in accordance with an embodiment of the present invention.

With reference now primarily to FIG. 3, an embodiment of a flow of events in an example definition process is shown in accordance with an embodiment of the present invention. As the following discussion proceeds with regard to FIG. 3, reference is made to FIGS. 4-8C to illustrate various aspects of embodiments of the present invention. As used herein, "user" is intended to refer to any one or more persons, computer operators, or the like, implementing the methodologies of embodiments of the present invention.

As a starting point, the user may define a first instance of the time-based organization hierarchy (e.g., the organization hierarchy 101, FIG. 1) (see, e.g., process block 301) to include one or more nodes, such as those described above, and illustrated in FIG. 1. In one embodiment, the user may define the first instance of the time-based organization hierarchy 101 via a UI display, as discussed above, such as that illustrated in FIG. 4.

Figure 4:
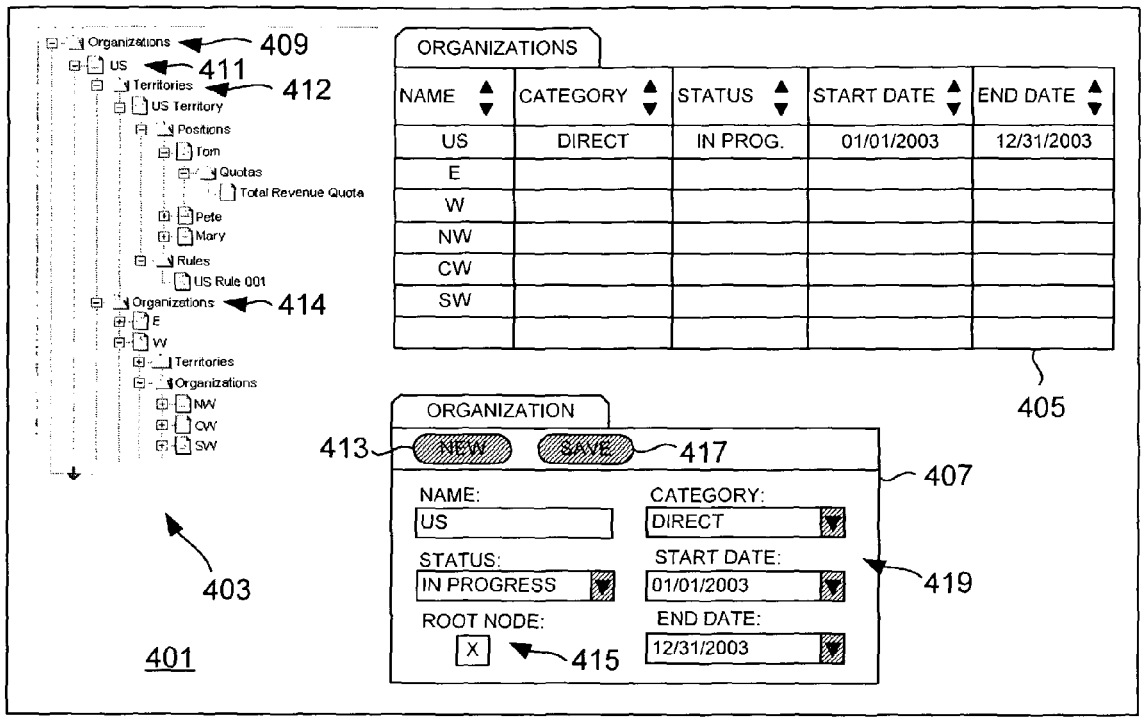
FIG. 4 is an illustration of an example screen display showing an embodiment of a user interface ("UI") display configured to define and manage nodes of an example organization hierarchy in accordance with an embodiment of the present invention.

FIG. 4 is an illustration of an example screen display showing an embodiment of an organization view UI display 401 configured to define and manage nodes of an example organization hierarchy (e.g., the organization hierarchy 101, FIG. 1) in accordance with an embodiment of the present invention. The organization view UI display 401 includes an organization tree applet 403 to display a visual representation of the relationship among the plurality of nodes of the organization hierarchy 101 and the elements associated with each node. In addition, the organization view UI display 401 may include an organization list applet 405, and an organization form applet 407, in an embodiment.

The organization tree applet 403 may, in one embodiment, include a plurality of folders (e.g., an organizations folder 409), and a plurality of corresponding records (e.g., a US record 411). It will be appreciated that the folders are merely a mechanism for organizing the records contained therein, and need not be present in all embodiments of the present invention. It will also be appreciated that the organization tree applet 403 illustrated in FIG. 4 and throughout the figures includes folders and/or records that would not be present at all stages of the definition process illustrated in FIG. 3, but would be added progressively as the hierarchy is defined by the user.

For example, as a starting point, only the organizations folder 409 may be present in the organization tree applet 403. When the user creates the first record (e.g., the US record 411), then additional folders (e.g., a territories folder 412 and a secondary organizations folder 414) may be created, in an embodiment.

Similarly, when records are created in the new folders (e.g., folders 412 and 414), respectively, then additional folders corresponding to those records will also be created in the organization tree applet 403, and so on. Each record and/or folder may be selected to show the folders and/or records contained therein. In this regard, it will also be appreciated that other records and/or folders corresponding to the "E" organization record, the "W" organization record, and the like, like those described above, are not shown in the organization tree applet 403 as illustrated in the figures, but may be accessed by the user by expanding (e.g., via selection thereof) those particular records.

As mentioned above, in one embodiment, when the user first accesses the organization view UI display 401, only a single folder (e.g., the top-most "organizations" folder 409) may be displayed in the organization tree applet 403. In order to define a first instance of the time-based organization hierarchy, the user may select the single folder (e.g., the "organizations" folder 409) and create a new organization record (by user selection of the "NEW" button 413) by entering data into the data fields 419 of the organization form applet 407. For example, the user may enter a "Name" for the organization record, such as "US," a "Category" (also "sales model") for the organization hierarchy (see, e.g., process block 303, FIG. 3), such as "Direct," and select a status, such as "In Progress," as well as a "Start Date" and an "End Date" for an effective period (see, e.g., process block 305, FIG. 3) that will correspond to the time-based organization hierarchy. Because this first organization represents the root node (see, e.g., the primary node 103, FIG. 1), an indicator 415 identifying this characteristic may appear on the organization form applet 407, in an embodiment. When all of the requisite information has been entered into the data fields 419 of the organization form applet 407, the user may select a "SAVE" button 417 to create an organization record (e.g., the organization record 411) corresponding to the data entered by the user. The organization record 411 may then appear in the organization tree applet 403 and in the organizations list applet 405, in an embodiment. It will be appreciated that with each "SAVE," the preceding information input by the user may be communicated to the application server 205 (see, e.g., FIG. 2) via the network 207 and ultimately to the database server 209 to facilitate storage of the information/data in the database 213.

As indicated above, the user may specify a "Name" for the organization record. The name may be chosen at the user's discretion, but for purposes of clarity, may correspond to a territory definition that will be created by the user, as discussed hereinafter. The "Category," or sales model, for the instance of the organization hierarchy may be selected by the user (see, e.g., block 303, FIG. 3) from a predefined list of values, such as direct sales (also "Direct"), service, product specialist, channel, inside sale, and global account, or the like, in an embodiment. It will be appreciated that these distinctions (i.e., sales models) may be used to define a relationship among participants in an organization hierarchy (e.g., between nodes). The terms used to correspond to the various sales models may be arbitrarily chosen to indicate a particular sales structure within an organization. The particular terms chosen and used herein generally describe business models used in industry, thereby enabling companies to more accurately label these hierarchy instances, but other terms may be used depending on the specific desires of the user.

The "Status" field of the organization form applet allows the user to select from a predefined list of values regarding the status of the organization hierarchy. When the hierarchy is being created, the "Status" will remain "In Progress." Other options may include "Submitted" (as part of an approval process), "Approved," and/or "Expired." In one embodiment, the organization form applet 407 may include data fields (not shown) in which the user may specify the date on which the organization hierarchy was submitted for review and approval, and to whom it was submitted to facilitate tracking within the company.

The "Start Date" and the "End Date" fields (of the organization form applet 407) correspond to an effective period for the organization hierarchy. In one embodiment in accordance with an embodiment of the present invention, only a single instance of a particular category (e.g., sales model) of organization hierarchy may be effective during any given calendar period. As such, the start date of a second instance of the organization hierarchy must be no earlier in time than the day following the end date of the first instance of the organization hierarchy. It will be appreciated however, that multiple instances of an organization hierarchy, each corresponding to a different category, may have overlapping effective periods, in an embodiment.

Continuing with the foregoing example, and with continued reference to FIG. 3, the user may next define a territory (see, e.g., process block 307) to correspond to the primary node (e.g., the US record 411) defined above. In one embodiment, the user may define the territory via a territory view UI display, such as that illustrated in FIG. 5. In one embodiment, user actuation of the "SAVE" button 417 (see, e.g., FIG. 4) to save the US record 411, may cause the territories folder 412 and the secondary organizations folder 414 to be created in the organization tree applet 403. User selection of the territories folder 412 may cause the territory view UI display 501 of FIG. 5 to be displayed by the client (e.g., the client 203, FIG. 2), in an embodiment.

Figure 5:
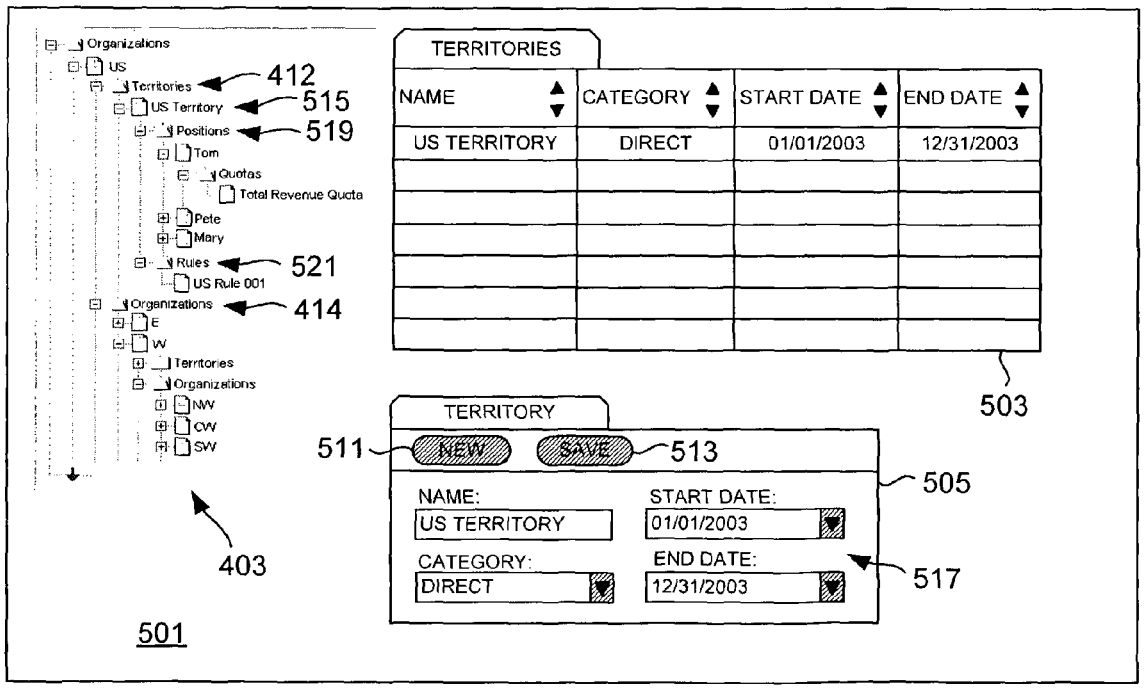
FIG. 5 is an illustration of an example screen display showing an embodiment of a UI display configured to define and manage territories of an example organization hierarchy in accordance with an embodiment of the present invention.

In one embodiment, the territory view UI display 501 of FIG. 5 includes the organization tree applet 403, as well as a territory list applet 503 and a territory form applet 505. In order to define a new territory, the user may select a "NEW" button 511 on the territory form applet 505. The user may, in an embodiment, enter information into the data fields 517 of the territory form applet 505 to define the territory corresponding to the previously defined node (e.g., the US record 411, FIG. 4; primary node 103, FIG. 1). The "Name" of the territory (e.g., "US Territory") may be selected from a picklist, in an embodiment, of available territories defined by a compensation administrator, for example. The user may also select a "Category" such as "Direct" as well as a "Start Date" and an "End Date." In one embodiment, the "Category" for the territory will be predefined to match the "Category" field selected for the corresponding node (e.g., the US record 411, FIG. 4), and the "Start Date" and "End Date" may be selected to fall within the period defined by the "Start Date" and "End Date" selected for the organization hierarchy instance (e.g., the "Start Date" and "End Date" defined for the primary node of the organization hierarchy) with which the territory is associated.

When all of the requisite information has been entered into the data fields 517 of the territory form applet 505, the user may save the defined territory by selecting a "SAVE" button 513 to add a territory record 515 (also "US Territory record") to the organization tree applet 403, and to the territory list applet 503, in an embodiment. In a manner similar to that described above in conjunction with FIG. 4, user actuation of the "SAVE" button 513 to save the US Territory record 515 may cause a positions folder 519 and a rules folder 521 to be created in the organization tree applet 403. In one embodiment, territory definitions may be reused in different organization hierarchies, or in different instances of an organization hierarchy, thereby reducing administrative effort and improving system performance in regard to the creation of new organization hierarchies.

Continuing with the foregoing example, and with continued reference to FIG. 3, the user may next define one or more positions (see, e.g., process block 309) to correspond to the previously defined territory (e.g., the US Territory record 515, FIG. 5). In one embodiment, user selection of the positions folder 519 may cause a positions view UI display, such as that illustrated in FIG. 6, to be generated by the client (e.g., the client 203, FIG. 2).

Figure 6:
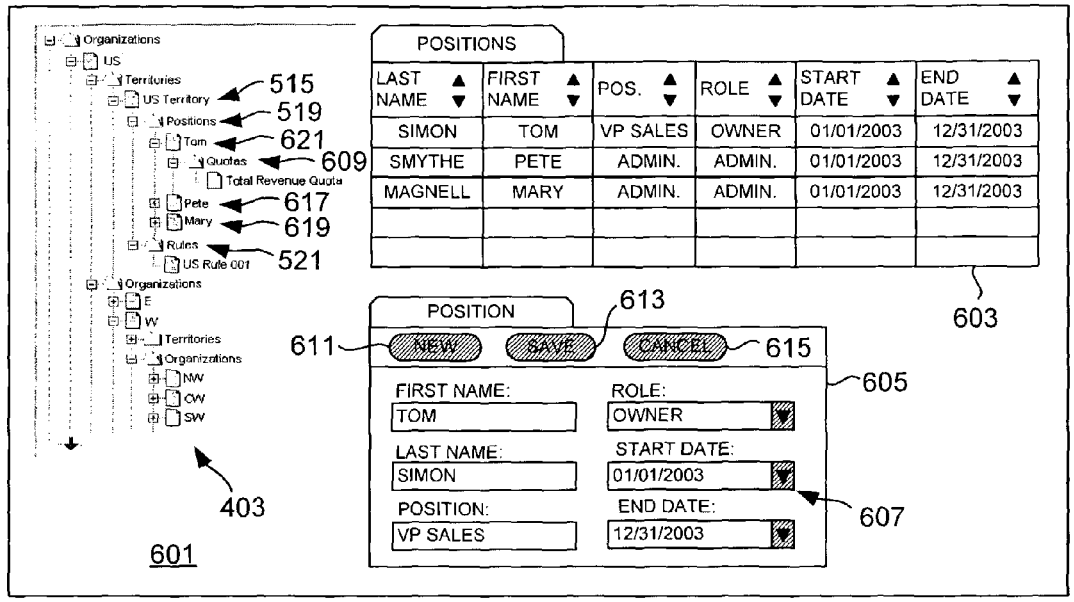
FIG. 6 is an illustration of an example screen display showing an embodiment of a UI display configured to define and manage positions of an example organization hierarchy in accordance with an embodiment of the present invention.

With reference now primarily to FIG. 6, the positions view UI display 601 includes, in one embodiment, the organization tree applet 403, as well as a positions list applet 603 and a position form applet 605 to receive a user input to define at least one position (see, e.g., block 309, FIG. 3) associated with the territory (e.g., the US Territory record 515) described above. In one embodiment, the user may define a position to correspond to the territory (e.g., the US Territory record 515) by selecting a "NEW" button 611 on the position form applet 605. The user may then enter information into the data fields 607 of the position form applet 605. For example, the user may select an individual (e.g., having a first name, last name, and company position) from a pick-list of available positions that may be assigned to a given level of the organization hierarchy, in an embodiment. For instance, in the present example, the Vice President of Sales, Tom Jefferson, may be selected as the position for which sales credit will be assigned, and compensation calculated, in regard to the defined node (e.g., the US record 411, FIG. 4) of the particular instance of the time-based organization hierarchy with which the position is associated (the position may actually be associated with the territory, and the territory corresponds to the node in the organization hierarchy).

In addition, a "Role" may be selected for the position, such as "Owner" or "Administrator." In one embodiment, only a single "Owner" position may correspond to any given territory (e.g., the US Territory record 515), but multiple "Administrator" positions may also be defined for the territory to allow multiple individuals to access and oversee the organization hierarchy, to the extent that it is accessible from any given node or organization record within the hierarchy. For instance, two example "Administrator" position records 617 and 619 are illustrated in the organization tree applet 403 corresponding to the defined territory (e.g., the US Territory record 515).

In one embodiment, the "Administrator" positions are configured to grant users access to the organization hierarchy only for the purpose of editing and/or managing the definition of lower levels of the organization hierarchy. For example, a user accessing the organization hierarchy via an "Administrator" position defined to correspond to the primary node 103 (see, e.g., FIG. 1) may define elements of the secondary nodes 105, 107 (see, e.g., FIG. 1) and/or the tertiary nodes 109-119 (see, e.g., FIG. 1), in an embodiment. In contrast, a user accessing the organization hierarchy via an "Administrator" position defined to correspond to the first secondary node 105 (see, e.g., FIG. 1) may define elements of the tertiary nodes 109-113 (see, e.g., FIG. 1) directly stemming therefrom and any child nodes of the tertiary nodes 109-113 (see, e.g., FIG. 1). It will be appreciated that "Administrator" positions need not necessarily be defined for all territories, and, in one embodiment, serve only an administrative purpose and are not assigned sales credit in response to a sales data input, as will be discussed in greater detail hereinafter. In addition to the foregoing, a "Start Date" and an "End Date" may also be defined for the position. In one embodiment, the "Start Date" and the "End Date" will fall within the period defined by the "Start Date" and the "End Date" defined for the territory, as described above in conjunction with FIG. 5.

When all of the requisite information has been entered by the user, the user may save the defined position by selecting a "SAVE" button 613 on the position form applet 605 to create a position record 621 corresponding to the defined position in the organization tree applet 403, and in the positions list applet 603, in an embodiment. It will be appreciated that the user may cancel positions from the territory (e.g., the US Territory record 515), in an embodiment, by identifying the position in the positions list applet 603 (via a cursor for example), and selecting a "CANCEL" button 615 on the position form applet 605. In a manner similar to that described above in conjunction with FIG. 4, user actuation of the "SAVE" button 613 to save the position record 621 may cause a quotas folder 609 to be created in the organization tree applet 403, in a manner similar to that described above.

With continued reference to the foregoing example, and to FIG. 3, the user may next define a quota (see, e.g., process block 311) to correspond to the previously defined position (see, e.g., the Tom record 621, FIG. 6). In one embodiment, user selection of the quotas folder 609 may cause a quotas view UI display, such as that illustrated in FIG. 7, to be generated by the client (e.g., the client 203, FIG. 2).

Figure 7:
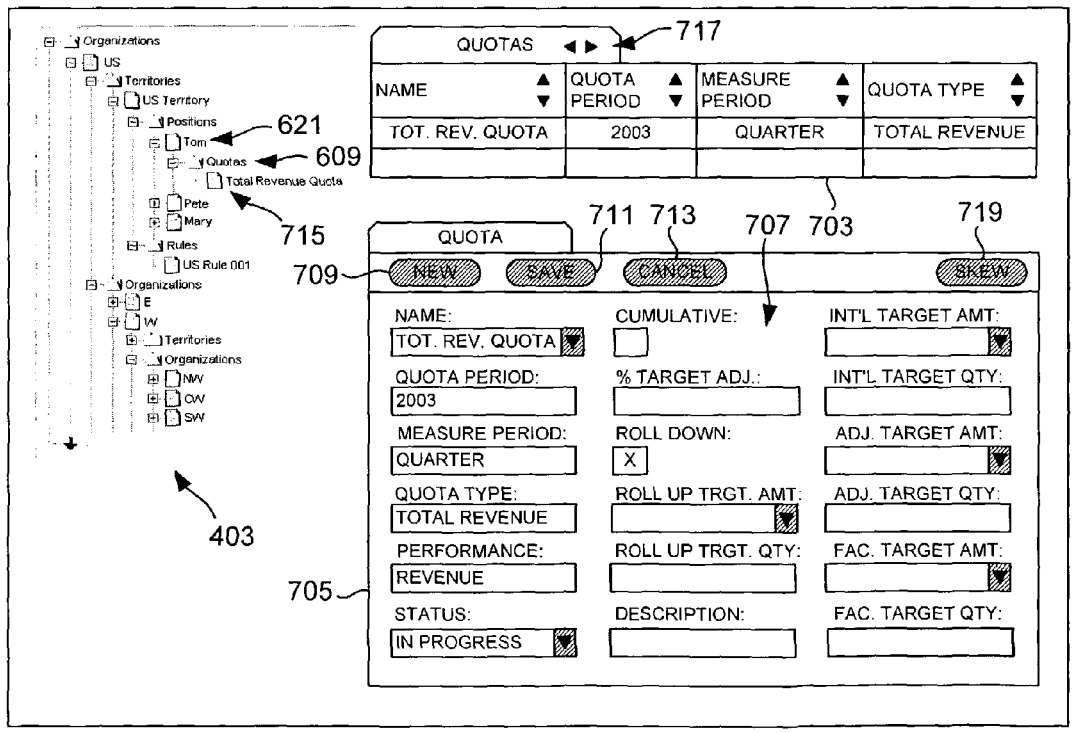
FIG. 7 is an illustration of an example screen display showing an embodiment of a UI display configured to define and manage quotas of an example organization hierarchy in accordance with an embodiment of the present invention.

With reference now primarily to FIG. 7, the quotas view UI display 701 includes, in one embodiment, the organization tree applet 403, as well as a quotas list applet 703 and a quota form applet 705 to receive a user input to define a quota (see, e.g., block 311, FIG. 3) to correspond to the defined position (e.g., the Tom record 621) described above. In one embodiment, the user may define a quota to correspond to the position (e.g., the Tom record 621) by selecting a "NEW" button 709 on the quota form applet 705. The user may then enter information into the data fields 707 of the quota form applet 705, in an embodiment.

For example, the user may specify a "Name" for the quota, identify a "Quota Type" such as a "Total Revenue Quota," define a "Quota Period" such as a year (e.g., 2003) and a "Measure Period" such as a quarter, month, or the like, and a "Performance Measure" such as revenue or product quantity. In addition, the user may also specify an "Initial Target Amount" and/or "Initial Target Quantity," an "Adjusted Target Amount" and/or "Adjusted Target Quantity," as well as a "Factored Target Amount" and/or "Factored Target Quantity," in an embodiment. The "Initial Target Amount" and/or "Initial Target Quantity" corresponds to the starting target in revenue amount or quantity of the employee on this Quota, in an embodiment. The "% Target Adjustment field contains a percentage to apply to an employee's initial target amount. The Adjusted Target Amount is updated for the employee on this Quota. The "Factored Target Amount" and/or "Factored Target Quantity" corresponds to the amount of the target after the factors have been applied by a manager. In one embodiment, the factored target starts with the adjusted target amount, then is changed based on the factors.

In addition to the foregoing, the user may specify a "Status" of the quota, as described previously, as well as a "Roll Up Target Amount," and a "Roll Up Target Quantity." final amount after the manager has adjusted and applied factors to employee's quotas. The user may also indicate whether the defined quota is intended to be cumulative. For example, if a "Cumulative" indicator (e.g., on the quota form applet 705) is selected by the user, the quota will accumulate from previous measure periods into the current measure period. For example, Q2 quota amount is the sum of Q1 and Q2, in an embodiment. The user may also indicate whether the defined quota is to be rolled down. For example, if a "Roll Down" indicator on the quota form applet 705 is selected by the user, the quota will be divided among the nodes (e.g., the secondary nodes 105, 107, FIG. 1) immediately below the node (e.g., the primary node 103, FIG. 1) to which the quota corresponds.

In one embodiment, the user may also enter a "Description" of the quota for administrative purposes. When all of the requisite information has been entered, the user may create a new quota record by selecting a "SAVE" button 711 on the quota form applet 705. The new quota record (e.g., the Total Revenue Quota record 715) may then be created in the organization tree applet 403 and in the quotas list applet 703, in an embodiment. The reader will note that not all of the data fields 707 of the quota form applet 705 are displayed in the quotas list applet 703 in the illustrated embodiment. However, in one embodiment, the user may view additional fields in the quotas list applet 703 by scrolling the display of the quotas list applet 703 via actuation of a pair of arrows indicated by reference numeral 717.

In some cases, the user may desire to apply a seasonality skew to the quota to accommodate different conditions in the market. In one embodiment, the user may define the seasonality skew by selecting a "SKEW" button 719 on the quota form applet 705. For example, and with reference primarily to FIG. 7A, a seasonality skew view UI display 721 includes, in one embodiment, the organization tree applet 403, as well as a quota seasonality skew list applet 723 and a skew entries list applet 725. In one embodiment, the user may create a new seasonality skew by selecting a "NEW" button 727, and entering a "Name" and "Measure Period" for the seasonality skew in the quota seasonality skew list applet 723. The user may also select a previously defined seasonality skew from the quota seasonality skew list applet 723, in an embodiment. For example, a seasonality skew defined for a parent node (e.g., the primary node 103, FIG. 1) may be available for selection to correspond to a quota associated with a child node (e.g., the secondary node 105, 107, FIG. 1). The "Measure Period" of the seasonality skew may correspond to the "Measure Period" of the quota to which the seasonality skew is to refer. The user may then define different percentages, different amounts, and/or different quantities for each period corresponding to the defined quota. When the requisite information has been entered, the user may save the seasonality skew by selecting the "SAVE" button 729, in an embodiment.

With continued reference to the foregoing example, and to FIG. 3, the reader will recall that in addition to the positions folder 519 (see, e.g., FIG. 6), the rules folder 521 (see, e.g., FIG. 6) was also created in the organization tree applet 403 in response to a user action to save the defined territory (e.g., the US Territory record 515, FIG. 5). In one embodiment, the user may next define an assignment rule (see, e.g., process block 313) to correspond to the previously defined territory (e.g., the US Territory record 515, FIG. 5). In a manner similar to user selection of the positions folder 519, user selection of the rules folder 521 from the organization tree applet 403 may cause a rules view UI display, such as that illustrated in FIG. 8, to be generated by the client (e.g., the client 203, FIG. 2), in an embodiment.

With reference now primarily to FIG. 8, the rules view UI display 801 includes, in one embodiment, the organization tree applet 403, as well as a rules list applet 803 and a rule form applet 805 configured to receive a user input to define an assignment rule to correspond to the defined territory (e.g., the US Territory 515, FIG. 5) described above. In one embodiment, the user may define an assignment rule to correspond to the territory (e.g., the US Territory record 515, FIG. 5) by selecting a "NEW" button 807 on the rule form applet 805. The user may then enter information into the data fields 808 of the rule form applet 805.

For example, the user may specify a "Name" for the rule such as "US Rule 001," a "Status," as described above, an "Object" against which the rule will be compared, as well as a "Rule Type," such as product, vertical, named account, and/or geographic, and a "Start Date" and an "End Date." In one embodiment, the "Start Date" and the "End Date" will fall within the calendar period defined by the "Start Date" and the "End Date" defined for the corresponding territory record (e.g., the US Territory record 515, FIG. 5). When all of the requisite information has been entered, the user may create a new rule record by selecting a "SAVE" button 809 on the rule form applet 805.

In one embodiment, user actuation of the "SAVE" button 809 on the rule form applet 805 may cause generation of a secondary rules view UI display, such as that illustrated in FIG. 8A or 8B. It will be appreciated that the UI displays illustrated in FIGS. 8A and 8B are identical, except for the tab selection (e.g., FIG. 8A shows a display corresponding to a Criteria tab 816, while FIG. 8B shows a display corresponding to a Credit Allocations tab 819) and corresponding display in the list applet 813. The secondary rules view UI display of FIGS. 8A and 8B may also include an assignment rule form applet 811, showing the data corresponding to the current rule that was previously entered by the user in the rule form applet 805 of FIG. 8.

With continued reference to the foregoing example, and to FIG. 3, the user may next define criteria (see, e.g., process block 315), and a credit allocation (see, e.g., process block 317) to correspond to the previously defined assignment rule (e.g., the US Rule 001 record 815).

With reference first to FIG. 8A, the user may specify a criteria (e.g., Country, State, or the like) against which a comparison will be made in order to facilitate sales credit assignment in association with the defined rule (e.g., the US Rule 001 record 815). The user may also specify a comparison method (e.g., Compare to Object) to identify the input source against which the comparison is to be made (in this case, an Order, as specified in the rule form applet 805 "Object" data field). In addition, the user may specify a value (e.g., Country=US) that may cause the condition created by the defined rule (e.g., the US Rule 001 record 815) to be "TRUE." In one embodiment, when all requisite information has been entered, the user may select a "SAVE" button 817, and then select the Credit Allocations tab 819 to view the display illustrated in FIG. 8B, for example.

With reference now primarily to FIG. 8B, the user may specify a position (e.g., the Tom record 621) corresponding to the defined territory (e.g., the US Territory record 515) with which the defined rule (e.g., the US Rule 001 815) is associated. In addition, the user may specify a "Start Date" and an "End Date" for the credit allocation, and a "Credit Split" (i.e., the percentage of sales credit for a particular transaction that will be assigned to the position if the condition associated with the corresponding rule is "TRUE"). In one embodiment, the "Start Date" and the "End Date" may fall within the calendar period defined by the "Start Date" and the "End Date" defined for the corresponding rule record (e.g., the US Rule 001 record 815).

With continued reference to the foregoing example, and to FIG. 3, when the user has finished defining the elements described above and illustrated by process blocks 301-317, a determination is made regarding whether the time-based organization hierarchy is complete (see, e.g., process block 319). If the organization hierarchy is not yet complete (e.g., additional nodes and/or territories need to be defined to complete the hierarchy), then the process illustrated in FIG. 3 may enter an iterative loop beginning again with process block 301. For example, in one embodiment, an individual associated with the first secondary node 105 (see, e.g., FIG. 1) may take on the role of the user to define the next node in the organization hierarchy and a corresponding territory, along with the other elements described above. In another embodiment, a single user may define the entire time-based organization hierarchy.

It will also be appreciated that, in one embodiment, all of the nodes of the organization hierarchy (e.g., the organization hierarchy 101, FIG. 1) may be defined first (see, e.g., block 301, FIG. 3), followed by all of the territories (see, e.g., block 307, FIG. 3), and so on, so that a single iteration of the definition process illustrated in FIG. 3 will result in a completely defined organization hierarchy. When the entire time-based organization hierarchy has been defined, as determined at process block 319 (see, e.g., FIG. 3), then the completed time-based organization hierarchy may be created and implemented, via a computer system for example, to assign sales credit and calculate compensation (see, e.g., process block 321) in response to a sales data input associated with a transaction.

With reference now primarily to FIG. 9, an embodiment of a flow of events in an example sales-based compensation process is shown in accordance with an embodiment of the present invention. In the embodiment illustrated in FIG. 9, a transaction (e.g., an order corresponding to a sale of a product or service) may be received by a computer system (via user input for example) such as the client 203 (see, e.g., FIG. 2) (see, e.g., process block 901). A sales data input, including information corresponding to the transaction such as an order date, amount, quantity, location, and the like, may then be imported to a server, for example (e.g., the application server 205, FIG. 2) (see, e.g., process block 903). The server may then process the sales data input in conjunction with one or more instances of an organization hierarchy (e.g., the organization hierarchy 101, FIG. 1) to assign and/or audit sales credit (see, e.g., process block 905) to correspond to one or more defined positions in response to one or more assignment rules.

At this point, the user may monitor his or her (or another's) achievement and attainment (e.g., how much of a node owner's quota has been fulfilled for a specified attainment period) (see, e.g., process block 907) corresponding to a position in the organization hierarchy, and compensation may be calculated based on the current sales credit assigned to any given position (see, e.g., process block 909).

In some cases, elements of the transaction (e.g., the amount of the transaction) may change from the time the transaction is first received, and the time it is invoiced and/or fully executed. In these cases, sales credit may be assigned based on the sales data input corresponding to the transaction, but may need to be adjusted to properly account for the net change in the transaction (e.g., the amount of the order may have increased, and the salespersons should be compensated accordingly). In order to effectively account for these changes, the system of an embodiment of the present invention may monitor the transaction for a net change (see, e.g., process block 911), and if a change is detected (see, e.g., process block 913), the sales credit may be re-assigned (see, e.g., block 905), and the process may enter an iterative loop so long as such changes continue to be detected.

By using the effective period defined for each instance of the organization hierarchy, retroactive transactions can accurately and automatically be processed using the instance of the organization hierarchy that was effective at the right point in time, thereby reducing or eliminating manual adjustments that are both error prone and time consuming. When no net change is detected (see, e.g., block 913), then the process begins anew with the receipt of a subsequent transaction (see, e.g., block 901) via another sales data input.

As will be appreciated, monitoring achievement and attainment of individual positions within the organization hierarchy permits a company to forecast a financial performance of the company based on the current and projected achievements of its employees. Moreover, monitoring one's own achievement and attainment allows an individual to assess his or her progress toward a defined minimum sales level, a bonus-incentive sales level or to project compensation for a specified period that is to be paid on a commission basis.

With reference now primarily to FIG. 10, a flow diagram illustrating an embodiment of a flow of events in an example achievement and attainment monitoring process 907 is shown in accordance with an embodiment of the present invention. In the illustrated embodiment, the achievement and attainment monitoring process 907 begins with defining one or more achievement containers (see, e.g., process block 1001). As used herein, an achievement container refers to a data structure configured to accumulate a unit of measure (e.g., product unit, revenue, or the like) for an individual for a specified period on the basis of transaction attributes, which will be discussed in greater detail hereinafter. For example, an achievement container may be defined to accumulate transactions for an individual for each day on the basis of the transaction attributes. The achievement containers may then simply be added up for any specified period (e.g., a month, a quarter, or the like) to calculate the individual's current attainment, or to calculate compensation.

Depending on the size of a company, attainment and compensation calculation may involve anywhere from a few transactions to a large number of transactions on a daily basis. The utilization of achievement containers, as described herein, improves the efficiency of calculations for attainment and compensation by using data summarized in the achievement containers, rather than extracting data from detailed source transactions.

In one embodiment, defining achievement containers (see, e.g., block 1001) includes defining and creating an achievement container definition that may then be implemented to create achievement containers to correspond to transactions received via the sales data inputs. For example, and with reference to FIG. 11, an illustration of an example screen display showing an embodiment of a UI display 1101 configured to define and manage achievement container definitions is shown in accordance with an embodiment of the present invention. In one embodiment, the achievement container definition UI display 1101 includes an achievement container definitions list applet 1103 and an achievement container definition form applet 1105. The user may input data into the data fields 1107 of the achievement container definition form applet 1105, in an embodiment, to define and/or edit new or existing achievement container definitions, respectively.

For example, the user may input data such as a "Name," and an achievement container "ID," and select a "Unit of Measure" (e.g., revenue or product units) and "Revenue Type"

(e.g., product or service) from a pull-down list of values. In addition, the user may select an organization hierarchy instance (e.g., US—Direct) with which the achievement container definition is to be associated, an "Accumulation Currency" (e.g., USD), and an "Inactive Date," if applicable. The "Inactive Date" refers to a date at which the achievement container definition is to become inactive, and will be replaced by a subsequent definition. In one embodiment, the "Inactive Date" may be entered at a subsequent point in time when, for example, the compensation administrator desires to change the way achievement is tracked and/or compensation is calculated. In one embodiment, only one achievement container definition may be active for any one instance of an organization hierarchy. The achievement container definition, once defined and created, may be valid for all positions associated with the instance of the organization hierarchy.

In addition to the foregoing information, in one embodiment, the user may specify an execution selection, and an execution selection accumulation period. The execution selection refers to a first trigger that causes the transaction to be recognized as an achievement eligible for compensation. In one embodiment, the execution selection may correspond to a status of the transaction for which achievement is to be tracked. The status of the transaction comprises a transaction attribute, and may include "Booked," "Invoiced," "Shipped," "Installed," "Paid," or the like, in an embodiment. For example, a company may compensate its sales representatives based on all transactions that are invoiced (e.g., the status of the transaction is "Invoiced") within a given period of time (e.g., monthly). When transactions are received via the sales data input, they may first be assigned a status of "Booked." Because the company in the foregoing example recognizes invoiced transactions, the transactions will only be accumulated in an achievement container when their status changes from "Booked" to "Invoiced." In one embodiment, an execution date (e.g., the date on which the status changes to "Invoiced"), corresponding to the execution selection, may be linked to the transaction.

The execution selection accumulation period refers to the accumulation period of the achievement container in which the transaction (and potentially other transactions) will be accumulated. In one embodiment, the execution selection accumulation period corresponds to a calendar unit (e.g., daily, weekly, monthly, quarterly, annually, or the like). If the execution selection accumulation period is defined as "monthly," for example, then all transactions with an execution date corresponding to a calendar month (e.g., January 2003, February 2003, and the like) will be accumulated in a common achievement container. In this example, twelve achievement containers would exist at the end of a calendar year, and the year-end attainment and/or compensation of the individual to which the achievement containers correspond, could be calculated by compiling together amounts (e.g., revenue or product units) from the twelve achievement containers.

In another embodiment, the achievement container definition may also include a plan selection and a plan selection accumulation period defined by a user input. The plan selection refers to a second trigger that effectively determines which compensation plan (as will be discussed hereinafter) will be used to calculate an individual's compensation. The plan selection permits use of a compensation plan other than a current compensation plan that would correspond to the execution selection. For example, the company may define a different compensation plan for each quarter of a calendar year. Like the execution selection described above, the plan selection may correspond, in an embodiment, to the status of the transaction, although in some cases the status may be a prior status of the transaction. For example, the company may decide to compensate its sales representatives for transactions invoiced during a given period (e.g., monthly), but use the compensation plan that was effective at the time each individual transaction was booked to calculate compensation. In one embodiment, a plan date (e.g., the date on which the status changed to "Booked"), corresponding to the plan selection, may be linked to the transaction.

The plan selection accumulation period, like the execution selection accumulation period, may correspond to a calendar unit (e.g., daily, weekly, monthly, quarterly, annually). The plan selection accumulation period may impact which achievement container the transaction accumulates in, and the number of achievement containers that are created for a given period of time. In one embodiment, the plan selection accumulation period and the execution selection accumulation period may correspond to a common calendar unit. In another embodiment, the plan selection accumulation period may correspond to a calendar unit distinct from the calendar unit corresponding to the execution selection accumulation period. For example, if the plan selection accumulation period is defined as "Daily," and the execution selection accumulation period is defined as "Monthly," then a separate achievement container may be created to accumulate all transactions that were booked within the same day, and which were invoiced within the same month.

In one embodiment, the plan selection and the execution selection may correspond to a common status. In another embodiment, the plan selection may correspond to a status distinct from the status corresponding to the execution selection. In yet another embodiment, if no plan selection is specified, the plan selection may automatically default to correspond to the specified execution selection. In this regard, it will be appreciated that the plan selection and the plan selection accumulation period need not necessarily be included in every embodiment of the present invention. Without the plan selection and the plan selection accumulation period, the compensation plan with an effective period corresponding to the execution date of the transaction may be used to calculate compensation. Similarly, if the plan selection and the plan selection accumulation period are defined to correspond to a status and calendar unit (e.g., an "Invoiced" status and a "Daily" calendar unit) identical to those corresponding to the execution selection and the execution selection accumulation period, then the plan selection and plan selection accumulation period will not impact the selection or the creation of the achievement container with which the transaction will be accumulated. In addition to the foregoing information, the user may also indicate whether the achievement accumulated in the achievement containers created in response to the achievement container definition should be rolled-up through the higher levels of the instance of the time-based organization hierarchy to which the achievement container definition refers. This aspect of the achievement and attainment monitoring process 907 (see, e.g., FIG. 10) will be discussed in greater detail hereinafter.

It will be appreciated that in another embodiment of the present invention, the execution selection and/or the plan selection may be defined outside of the achievement container definition, and the achievement container definition may correspond to only a single accumulation period. For example, a system-wide configuration may be implemented wherein the transaction(s) corresponding to each sales data input is accumulated in an achievement container, the period of which corresponds to the accumulation period defined in the achievement container definition, in response to a first trigger (e.g., the execution selection). In effect, the execution selection date and the execution selection accumulation period are removed from consideration and the transaction data is accumulated in an achievement container corresponding to a plan selection date and having the accumulation period defined in the achievement container definition (which is effectively now the plan selection accumulation period). For instance, in one embodiment, the system may be configured such that transactions may be accumulated in achievement containers when they are invoiced (e.g., the execution selection=a status of "Invoiced"), but the achievement container will correspond to a date (e.g., January 2003, assuming the accumulation period="monthly") on which the transaction was booked (e.g., Jan. 10, 2003).

With continued reference to FIG. 10, having defined and created one or more achievement container definitions via a user input, the achievement and attainment monitoring process 907 proceeds to accumulate transaction data in one or more achievement containers (see, e.g., process block 1003). As mentioned previously, achievement containers are created in response to the achievement container definition and the transaction attributes of transactions imported via a sales data input (see, e.g., block 903, FIG. 9) and assigned to one or more positions via a sales credit assignment process (see, e.g., block 905, FIG. 9). An embodiment of a sales credit assignment process is described in greater detail in co-pending U.S. patent application Ser. No. 10/273,679, filed Oct. 18, 2002, and titled METHOD AND SYSTEM FOR SALES CREDIT ASSIGNMENT VIA TIME-BASED ORGANIZATION HIERARCHIES, incorporated herein by reference.

With reference now primarily to FIG. 12, a flow diagram illustrating an embodiment of a flow of events in an example transaction data accumulation process 1003 is shown in accordance with an embodiment of the present invention. As the following discussion proceeds with regard to FIG. 12, reference is made to FIGS. 13A-14D to illustrate various aspects of embodiments of the present invention. In addition, the example achievement container definition corresponding to achievement container "ID" 103, shown in the achievement container definitions list applet 1103 and in the achievement container definition form applet 1105 of FIG. 11, will be referenced as the active achievement container in the following discussion. The example achievement container definition ("ID" 103) may be defined by a compensation administrator to facilitate the compensation of company employees for invoiced transactions, while using the compensation plan in effect at the time those transactions were booked.

In the illustrated embodiment of FIG. 12, the transaction data accumulation process 1003 begins with the identification of transaction attributes (see, e.g., process block 1201). For example, FIGS. 13A-13B illustrate an embodiment of a data structure including a plurality of transactions and corresponding transaction attributes in accordance with an embodiment of the present invention. FIG. 13A shows four transactions comprised of transaction attributes including an order #, a revenue type, a plan date, an execution date, a status, an amount, and a team & credit identifier. The team & credit identifier transaction attribute may have been generated by the sales credit assignment process (see, e.g., block 905, FIG. 9), mentioned above, in an embodiment.

As the reader will note, the current example achievement container definition (see, e.g., FIG. 11) specifies a plan selection corresponding to a "Booked" status of the transaction. As a consequence, the "plan date" transaction attribute corresponding to each of the four example transactions illustrated in FIG. 13A is populated with a first date corresponding to the date on which the respective transaction's status (i.e., the "status" transaction attribute) became "Booked." It will be noted that the "execution date" transaction attribute remains unpopulated for each transaction in FIG. 13A because the example achievement container definition specifies (see, e.g., FIG. 11) the execution selection to correspond to an "Invoiced" status, which has not yet occurred for any one of the four example transactions in our example. FIG. 13B shows the same four transactions illustrated in FIG. 13A, now with the "status" transaction attribute changed to "Invoiced," and with the "execution date" transaction attribute, corresponding to each of the transactions, populated with a second date corresponding to the date on which the respective transaction's status changed to "Invoiced."

With continued reference to FIG. 12, having identified the transaction attributes of a first of the four transactions, the transaction data accumulation process 1003 may proceed to compare the "status" transaction attribute of the first transaction against the execution selection of the active achievement container definition (e.g., the achievement container definition having "ID" 103) (see, e.g., process block 1203). If the "status" transaction attribute of the first transaction doesn't match the execution selection of the active achievement container definition (e.g., the "status" transaction attribute is populated with "Booked," see FIG. 13A), then the transaction data accumulation process 1003 enters an iterative loop beginning again at process block 1201, identifying the transaction attributes of a next transaction, and comparing the "status" transaction attribute of the next transaction against the execution selection of the active achievement container definition (see, e.g., block 1203).

If or when the transaction data accumulation process 1003 identifies a transaction with a "status" transaction attribute corresponding to the execution selection of the active achievement container definition (e.g., the "status" transaction attribute is populated with "Invoiced," see FIG. 13B), then the process 1003 proceeds to determine whether there is an existing achievement container with attributes corresponding to the transaction attributes (see, e.g., process block 1205). For the first transaction, no existing achievement container having attributes corresponding to the transaction attributes will exist as determined at process block 1205, and as such, the transaction data accumulation process 1003 will proceed to generate a new achievement container with attributes corresponding to the transaction attributes, and add the first transaction to the newly generated achievement container (see, e.g., process block 1209).

For example, FIG. 14A is an illustration of an example achievement container showing the achievement container attributes in accordance with an embodiment of the present invention. In one embodiment, the achievement container attributes may include the achievement container ID corresponding to the achievement container definition used to create the achievement container, as well as the plan selection date, the execution selection date, the position, the territory, and the amount, each corresponding to the transaction. The plan selection date achievement container attribute corresponds to the date (e.g., May 5, 2003) associated with the plan date transaction attribute of the first transaction to be accumulated in the container (and consequently to each additional transaction that will be accumulated in the achievement container).

In one embodiment, the plan selection date achievement container attribute may be defined to correspond to the plan selection accumulation period. For example, because the plan selection accumulation period of the active achievement container definition (see, e.g., FIG. 11) is specified as "Daily," the plan selection date achievement container attribute will be populated with a date specific to the day (e.g., May 5, 2003) corresponding to the plan date transaction attribute. Similarly, the execution selection date achievement container attribute may be defined to correspond to the execution selection accumulation period, in an embodiment. For example, because the execution selection accumulation period of the active achievement container definition (see, e.g., FIG. 11) is specified as "Monthly," the execution selection date achievement container attribute may be populated with a date specific to the month (e.g., October '03) corresponding to the execution date transaction attribute.

The position and territory achievement container attributes may be taken directly from the team & credit indicator transaction attribute of the transaction. The "Amount" indicated in the achievement container illustrated in FIG. 14A (as well as those illustrated in FIGS. 14B-14D) corresponds, in an embodiment, to the sum of the amounts of the transactions accumulated in the specific achievement container. So, for example, after the first transaction has been added to the newly generated achievement container (see, e.g., block 1209, FIG. 12), the "Amount" indicated in the achievement container illustrated in FIG. 14A would actually only be "$10,000." It is not until the next transaction is added to the achievement container, that the "Amount" becomes "$18,000," as will be discussed below.

With continued reference to FIG. 12, having generated a new achievement container with attributes corresponding to the transaction attributes of the first transaction illustrated in FIGS. 13A-13B (see, e.g., block 1209), the transaction data accumulation process 1003 proceeds to roll achievement up to each achievement container associated with an upper level position in the identified organization hierarchy (e.g., US—Direct) (see, e.g., process block 1211). The reader will recall that the active achievement container definition specifies a "Roll Up," and identifies an organization hierarchy to which the achievement container definition corresponds (see, e.g., the achievement container definition form applet 1105, FIG. 11).

In one embodiment, an achievement container may be created to correspond to each position and territory in the upper levels of the organization hierarchy referenced by the achievement container definition. For example, if the position and territory corresponding to the first transaction (e.g., illustrated in FIGS. 13A-13B) are associated with the first tertiary node 109 of the example organization hierarchy illustrated in FIG. 1, then achievement containers may be created to correspond to each territory and position associated with the first secondary node 105 and the primary node 103 of the organization hierarchy (see, e.g., the achievement container illustrated in FIG. 14D for an example of the achievement container that may be created to correspond to the position and territory associated with the primary node 103, FIG. 1).

After rolling up the achievement to each upper level node within the corresponding organization hierarchy, the transaction data accumulation process 1003 enters an iterative loop beginning again at process block 1201 wherein the transaction attributes of the next transaction are identified (e.g., the second transaction illustrated in FIGS. 13A-13B). The "status" transaction attribute may then be compared against the execution selection of the active achievement container definition (see, e.g., "ID" 103, FIG. 11) (see, e.g., block 1203). As illustrated in FIG. 13B, the "status" transaction attribute matches the execution selection of the active achievement container definition, and consequently a determination may be made regarding whether there is an existing achievement container with attributes corresponding to the transaction attributes of the second transaction (see, e.g., block 1205).

In the case of the second transaction, the previously generated achievement container (see, e.g., FIG. 14A) has achievement container attributes corresponding to the transaction attributes of the second transaction. For instance, the position and territory correspond to the transaction, and the plan selection date and the execution selection date correspond to the plan date and the execution date of the transaction, respectively, as well. The plan selection date corresponds to the specific day of the plan date (i.e., in accordance with the "Daily" plan selection accumulation period), and the execution selection date corresponds to the specific month of the execution date (i.e., in accordance with the "Monthly" execution selection accumulation period). Because the second transaction corresponds to the existing achievement container (see, e.g., FIG. 14A), the second transaction may be added to the existing achievement container (see, e.g., process block 1207), and the transaction date accumulation process 1003 proceeds, as described previously.

The remaining two transactions illustrated in FIGS. 13A-13B may be processed in a manner similar to that described above. Because the remaining two transactions do not correspond to an existing achievement container, new achievement containers, such as those illustrated in FIGS. 14B and 14C, may be created with achievement container attributes corresponding to the transaction attributes of the respective transactions.

It will be appreciated that other transaction attributes (e.g., a product identifier or customer identifier) may also be utilized to filter transaction data and selectively accumulate the transaction date in different achievement containers in response to these transaction attributes. For example, all transactions corresponding to a particular customer or product may be accumulated in a common achievement container, or common achievement containers in which a date (e.g., a plan selection date) associated with the transaction is also considered. In this regard, transaction data may be filtered and routed to any one of a number of achievement containers having the appropriate corresponding attributes, in an embodiment.

In one embodiment, the compensation administrator may also have an opportunity to perform a retro-accumulation process after the transaction data accumulation process 1003 has been executed. The retro-accumulation process, in one embodiment, may permit the compensation administrator to re-assign existing transactions to new and/or different achievement containers and/or update existing achievement containers with any missed transactions.

It will be appreciated that transaction data, as described previously, may be processed in real-time as sales data inputs are received by a system, in an embodiment. In other cases, the transaction data may be periodically processed in batch form and accumulated in the appropriate achievement container.

With continued reference to FIG. 10, after accumulating transaction data in the achievement container(s) (see, e.g., block 1003), as described above, the achievement and attainment monitoring process 907 proceeds to compile the achievement container(s) corresponding to a user-specified position and attainment period (see, e.g., process block 1005). In one embodiment, compiling the achievement container(s) may include specifying the position (e.g., Terry) and the attainment period (e.g., Q4 2003) via a user input, to calculate an individual's (or sales team's) attainment corresponding to the user-specified attainment period. For example, FIG. 15 illustrates an example set of attainment run criteria in accordance with an embodiment of the present invention that may include a "Name," the "Position" for which the attainment is sought, and the "Attainment Period" from which achievement containers are to be compiled.

With continued reference to the foregoing example, and to the example achievement containers illustrated in FIGS. 14A-14D, the attainment run criteria when executed (e.g., by the application server 205, FIG. 2), may produce a result such as that illustrated in FIG. 16. In one embodiment, because the specified attainment period is the fourth quarter of 2003, all achievement containers corresponding to the "Terry" position, and having an execution selection date within the fourth quarter of 2003 (i.e., Oct. '03, Nov. '03, and Dec. '03) (e.g., the achievement containers illustrated in FIGS. 14A and 14C) will be identified and compiled to produce the result. The result (see, e.g., FIG. 16) may include the position, the total current achievement (e.g., a sum of the amounts from the identified achievement containers), an indication of the quota corresponding to the specified position, and the current percentage of the quota that has been achieved.

While monitoring one's attainment may provide an incentive to meet company or personal expectations, the calculation of compensation may be regarded by employees as the more important aspect of the sales-based compensation process illustrated in FIG. 9. In one embodiment, the calculation of compensation 909 (see, e.g., FIG. 9) may be based on the same achievement containers created in conjunction with the achievement container definitions described above. For example, FIG. 17 is a flow diagram illustrating an embodiment of a flow of events in an example compensation calculation process 909 in accordance with an embodiment of the present invention. As the following discussion proceeds with regard to FIG. 17, reference is made to FIGS. 18A-20 to illustrate various aspects of embodiments in accordance with the invention.

The compensation calculation process 909 begins with the definition and creation of one or more compensation plans in response to a user input (see, e.g., process block 1701). Examples of two compensation plans are illustrated in FIGS. 18A and 18B. Defining a compensation plan may include identifying participants for the plan (see, e.g., process block 1703) such as one or more sales representatives, or the like. In addition, defining the compensation plan may also include defining a compensation plan effective period (see, e.g., process block 1705). It will be appreciated that the compensation plan effective period may be used to determine which compensation plan is to be used to calculate compensation in response to a plan selection date achievement container attribute, as will be discussed in greater detail hereinafter.

In addition to the foregoing, defining the compensation plan may include specifying a performance measure (see, e.g., process block 1707), and a measure period (see, e.g., process block 1709). For example, the performance measure of the compensation plan may specify a "% Quota" performance measure, and a measure period corresponding to a "Quarter." In one embodiment, the measure period for the compensation plan may correspond to the defined measure period for the quota (see, e.g., FIG. 7) associated with the participants specified for the compensation plan. Additionally, defining the compensation plan may include specifying an achievement container definition (e.g., via the "ID" achievement container attribute) (see, e.g., process block 1711), and identifying an organization hierarchy with which the compensation plan may be applied (see, e.g., 1713).

With the user input of the foregoing information, one or more compensation plans may be created. For example, the company may define a different compensation plan for each quarter of a calendar year, two of which (e.g., Q2 and Q4) are illustrated in FIGS. 18A and 18B, the only distinction being the name of the compensation plan and the defined compensation plan effective period.

Having defined and created the compensation plan (see, e.g., block 1701), the compensation calculation process 909 proceeds to specify a position and a compensation period in response to another user input, in an embodiment (see, e.g., process block 1715). For example, FIG. 19 illustrates a set of example compensation run criteria in accordance with an embodiment of the present invention. In one embodiment, the compensation run criteria may include a "Name," and the "Position" and "Compensation Period," similar to the criteria described above in conjunction with the attainment run, and illustrated in FIG. 15.

The compensation calculation process 909 next proceeds to identify, for the defined position, each achievement container or containers with an execution selection date achievement container attribute corresponding to the user-specified compensation period (see, e.g., process block 1717). For example, for a compensation period defined as the fourth quarter of 2003, two of the example achievement containers discussed above (e.g., the achievement containers illustrated in FIGS. 14A and 14C) will be identified.

Next, the compensation calculation process 909 proceeds to implement the defined compensation plan (e.g., the compensation plans illustrated in FIGS. 18A and 18B) that corresponds to the plan selection date achievement container attribute of each identified achievement container (i.e., the achievement containers identified in conjunction with process block 1717) (see, e.g., process block 1719). For example, the first identified achievement container has a plan selection date corresponding to May 5, 2003 (see, e.g., FIG. 14A), which corresponds to the effective period of the Q2 2003 compensation plan (see, e.g., FIG. 18A). In contrast, the second identified achievement container has a plan selection date corresponding to Oct. 15, 2003 (see, e.g., FIG. 14C), which corresponds to the effective period of the Q4 2003 compensation plan (see, e.g., FIG. 18B).

In the embodiment illustrated in FIG. 17, the compensation calculation process 909 then proceeds to compile the results from each implemented compensation plan to generate a compensation result such as that illustrated in FIG. 20 (see, e.g., process block 1721). In one embodiment, the result may include an indication of the position, a total from each implemented compensation plan, an individual's compensation, as calculated from each plan (e.g., a 50% commission on the total for the plan), and a total compensation.

In one embodiment, the achievements or compensation for groups may be evaluated and/or calculated by determining the upper-most node in the organization hierarchy (and corresponding territory/position) to which the group corresponds, and using the achievement containers associated with that node to calculate attainment and/or compensation. In another embodiment, transaction data corresponding to at least two positions associated with an instance of the time-based organization hierarchy may be accumulated in an achievement container corresponding to a sales team. For example, two or more individuals (i.e., positions) may be grouped into a sales team, the compensation (e.g., a bonus) for which may be linked to the team's performance. As such, an achievement container specific to the sales team may aid in compiling the group's total sales.

Moreover, and as described above, transactions may also be monitored (see, e.g., block 911, FIG. 9) to detect any net changes in the transactions, which may cause sales credit assignments, achievement/attainment, and compensation to be recalculated to account for the adjustments. For example, achievement containers may be re-compiled in response to a compensation plan modification (e.g., a change in plan participants, percentages, or the like).

In one embodiment of the present invention, the user may examine the transactions that have been accumulated in one or more achievement containers. For example, in one embodiment, the user may access achievement containers that are linked to a specific position via the organization tree applet 403 (see, e.g., FIGS. 4-8B). By selecting a particular achievement container from the organization tree applet 403, all transactions that have been accumulated in the selected achievement container may be indicated in a display or other output. In still other embodiments, the user may access achievement containers corresponding to a particular territory or time period (e.g., corresponding to a position, territory, or instance of an organization hierarchy).

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A method, comprising:
   in response to a first user input, creating, using a computing system, a first instance of a time-based organization hierarchy to include a first plurality of nodes and a first territory to correspond to each of the first plurality of nodes, wherein
      the first territory includes a first position and a first assignment rule, and
      the entire first instance of the time-based organization hierarchy is effective only for an effective period defined by a first start date and a first end date;
   in response to a second user input, creating, using the computing system, a second instance of the time-based organization hierarchy to include a second plurality of nodes and a second territory to correspond to each of the second plurality of nodes, wherein
      the second territory includes a second position and a second assignment rule,
      the entire second instance of the time-based organization hierarchy is effective only for an other effective period defined by a second start date and a second end date, and
      the second start date falls after the first end date;
   receiving a sales data input corresponding to a transaction, wherein the transaction is associated with a transaction date of the transaction;
   assigning, using the computing system, sales credit to the first position in response to a first corresponding assignment rule and the sales data input, if the transaction date of the transaction corresponds to the effective period;
   assigning, using the computing system, sales credit to the second position in response to a second corresponding assignment rule and the sales data input, if the transaction date of the transaction corresponds to the other effective period;
   creating, using the computing system, an achievement container definition to include an accumulation period in response to a third user input, the achievement container definition configured to create at least one achievement container having a period corresponding to the accumulation period; and
   accumulating, using the computing system, transaction data in the at least one achievement container.

2. The method of claim 1, further comprising, compiling each achievement container corresponding to a position and an attainment period specified by a user in response to a monitoring request.

3. The method of claim 2, further comprising, recompiling each achievement container corresponding to the position and the attainment period specified by the user in response to a compensation plan modification.

4. The method of claim 1, wherein the accumulation period comprises an execution selection accumulation period and the period of the at least one achievement container corresponds to an execution selection date.

5. The method of claim 1, wherein the accumulation period comprises a plan selection accumulation period and the period of the at least one achievement container corresponds to a plan selection date.

6. The method of claim 1, wherein the accumulating is performed in response to a status of the transaction.

7. The method of claim 6, wherein the status is selected from a group comprising at least one of booked, invoiced, shipped, installed, and paid.

8. The method of claim 1, wherein accumulating transaction data in the at least one achievement container includes:
   identifying transaction attributes;
   adding the transaction to at least one existing achievement container, if an achievement container exists having attributes matching the transaction attributes; and
   if no achievement container exists with matching attributes, generating at least one new achievement container with attributes matching the transaction attributes and adding the transaction to the at least one new achievement container.

9. The method of claim 8, further comprising:
   identifying the instance of the organization hierarchy associated with the achievement container to which the transaction is added; and
   rolling up achievement to each achievement container associated with an upper level position in the identified organization hierarchy.

10. The method of claim 1, wherein accumulating transaction data in the at least one achievement container includes filtering the transaction data to selectively accumulate transaction data in different achievement containers in response to a transaction attribute.

11. The method of claim 10, wherein the transaction attribute comprises at least one of a product identifier or a customer identifier.

12. The method of claim 1, wherein accumulating transaction data in the at least one achievement container includes periodically processing a batch of transaction data.

13. The method of claim 1, wherein the achievement container definition is further configured to create the at least one achievement container to correspond to a sales team to accumulate transaction data corresponding to at least two positions associated with an instance of a time-based organization hierarchy.

14. The method of claim 1, further comprising, generating an indication of all transactions that have been accumulated in at least one specified achievement container in response to a third user input.

15. The method of claim 14, wherein the at least one specified achievement container corresponds to at least one of a user-specified time period, a user-specified territory, or a user-specified position.

16. The method of claim 1, wherein
the first instance of the time-based organization hierarchy comprises first data,
the first data is effective for the effective period,
the second instance of the time-based organization hierarchy comprises second data, and
the second data is effective for the other effective period.

17. The method of claim 16, wherein
the first data is only effective for the effective period, and
the second data is only effective for the other effective period.

18. A method, comprising:
in response to a first user input, creating, using a computing system, a first instance of a time-based organization hierarchy to include a first plurality of nodes and a first territory to correspond to each of the first plurality of nodes, wherein
the first territory includes a first position and a first assignment rule, and
the entire first instance of the time-based organization hierarchy is effective only for an effective period defined by a first start date and a first end date;
in response to a second user input, creating, using the computing system, a second instance of the time-based organization hierarchy to include a second plurality of nodes and a second territory to correspond to each of the second plurality of nodes, wherein
the second territory includes a second position and a second assignment rule,
the entire second instance of the time-based organization hierarchy is effective only for an other effective period defined by a second start date and a second end date, and
the second start date falls after the first end date;
receiving a sales data input corresponding to a transaction, wherein the transaction is associated with a transaction date of the transaction;
assigning, using the computing system, sales credit to the first position in response to the first assignment rule and the sales data input, if the transaction date of the transaction corresponds to the effective period;
assigning, using the computing system, sales credit to the second position in response to the second assignment rule and the sales data input, if the transaction date of the transaction corresponds to the other effective period;
creating, using the computing system, an achievement container definition to include an execution selection and an execution selection accumulation period in response to a third user input, the achievement container definition configured to create at least one achievement container with an execution selection date corresponding to the execution selection and the execution selection accumulation period;
accumulating, using the computing system, transaction data in the at least one achievement container; and
compiling, using the computing system, each achievement container corresponding to the position and an attainment period specified by a user in response to a monitoring request.

19. The method of claim 18, wherein the achievement container definition further includes a plan selection and a plan selection accumulation period, the achievement container definition further configured to create the at least one achievement container with a plan selection date corresponding to the plan selection and the plan selection accumulation period.

20. The method of claim 19, wherein the execution selection and the plan selection correspond to a status of the transaction, the status selected from a group comprising at least one of booked, invoiced, shipped, installed, and paid.

21. The method of claim 20, wherein the execution selection and the plan selection correspond to a common status.

22. The method of claim 19, wherein the execution selection accumulation period and the plan selection accumulation period correspond to a calendar unit, the calendar unit selected from a group comprising at least one of daily, weekly, monthly, quarterly, and annually.

23. The method of claim 22, wherein the execution selection accumulation period and the plan selection accumulation period correspond to a distinct calendar unit.

24. The method of claim 19, further comprising:
creating at least one compensation plan in response to a fourth user input, the compensation plan including at least one position, a compensation plan effective period, a performance measure, a measure period, and an identification of a corresponding achievement container definition;
specifying a compensation period in response to a fifth user input;
identifying all existing achievement containers having an execution selection date corresponding to the specified compensation period;
implementing the at least one compensation plan in response to a plan selection date corresponding to each identified achievement container; and
compiling a result from each implemented compensation plan.

25. A machine-readable storage medium having instructions stored thereon, which when executed perform operations comprising:
in response to a first user input, creating a first instance of a time-based organization hierarchy to include a first plurality of nodes and a first territory to correspond to each of the first plurality of nodes, wherein
the first territory includes a first position and a first assignment rule, and
the entire first instance of the time-based organization hierarchy is effective only for an effective period defined by a first start date and a first end date;
in response to a second user input, creating a second instance of the time-based organization hierarchy to include a second plurality of nodes and a second territory to correspond to each of the second plurality of nodes, wherein
the second territory includes a second position and a second assignment rule,
the entire second instance of the time-based organization hierarchy is effective only for an other effective period defined by a second start date and a second end date, and
the second start date falls after the first end date;
receiving a sales data input corresponding to a transaction, wherein the transaction is associated with a transaction date of the transaction;
assigning sales credit to the first position in response to the first assignment rule and the sales data input, if the transaction date of the transaction corresponds to the effective period;

assigning sales credit to the second position in response to the second assignment rule and the sales data input, if the transaction date of the transaction corresponds to the other effective period;

creating an achievement container definition to include an accumulation period in response to a third user input, the achievement container definition configured to create at least one achievement container having a period corresponding to the accumulation period; and accumulating transaction data in the at least one achievement container.

26. The machine-readable storage medium of claim 25, wherein execution of the instructions further performs the operation of compiling each achievement container corresponding to the position and an attainment period specified by a user in response to a monitoring request.

27. The machine-readable storage medium of claim 25, wherein the accumulation period comprises an execution selection accumulation period and the period of the at least one achievement container corresponds to an execution selection date.

28. The machine-readable storage medium of claim 25, wherein the accumulation period comprises a plan selection accumulation period and the period of the at least one achievement container corresponds to a plan selection date.

29. The machine-readable storage medium of claim 25, wherein the accumulating is performed in response to a status of the transaction.

30. The machine-readable storage medium of claim 29, wherein the status is selected from a group comprising at least one of booked, invoiced, shipped, installed, and paid.

31. The machine-readable storage medium of claim 25, wherein accumulating transaction data in the at least one achievement container includes:
   identifying transaction attributes;
   adding the transaction to at least one existing achievement container, if an achievement container exists having attributes matching the transaction attributes; and
   if no achievement container exists with matching attributes, generating at least one new achievement container with attributes matching the transaction attributes and adding the transaction to the at least one new achievement container.

32. The machine-readable storage medium of claim 31, wherein execution of the instructions further performs operations comprising:
   identifying the instance of the organization hierarchy associated with the achievement container to which the transaction is added; and
   rolling up achievement to each achievement container associated with an upper level position in the identified organization hierarchy.

33. The machine-readable storage medium of claim 25, wherein accumulating transaction data in the at least one achievement container includes filtering the transaction data to selectively accumulate transaction data in different achievement containers in response to a transaction attribute.

34. The machine-readable storage medium of claim 33, wherein the transaction attribute comprises at least one of a product identifier or a customer identifier.

35. The machine-readable storage medium of claim 26, wherein execution of the instructions further performs the operation of recompiling each achievement container corresponding to the position and the attainment period specified by the user in response to a compensation plan modification.

36. The machine-readable storage medium of claim 25, wherein accumulating transaction data in the at least one achievement container includes periodically processing a batch of transaction data.

37. The machine-readable storage medium of claim 25, wherein the achievement container definition further includes a team criteria in response to the third user input, and the achievement container definition is further configured to create the at least one achievement container to correspond to the team criteria to accumulate transaction data corresponding to at least two positions associated with an instance of a time-based organization hierarchy.

38. The machine-readable storage medium of claim 25, wherein execution of the instructions further performs the operation of generating an indication of all transactions that have been accumulated in at least one specified achievement container in response to a fourth user input.

39. The machine-readable storage medium of claim 38, wherein the at least one specified achievement container corresponds to at least one of a user-specified time period, a user-specified territory, or a user-specified position.

40. A machine-readable storage medium having instructions stored thereon, which when executed perform operations comprising:
   in response to a first user input, defining a first instance of a time-based organization hierarchy to include a first plurality of nodes and a first territory to correspond to each of the first plurality of nodes, wherein
      the first territory includes a first position and a first assignment rule, and
      the entire first instance of the time-based organization hierarchy is effective only for an effective period defined by a first start date and a first end date;
   in response to a second user input, defining a second instance of the time-based organization hierarchy to include a second plurality of nodes and a second territory to correspond to each of the second plurality of nodes, wherein
      the second territory includes a second position and a second assignment rule,
      the entire second instance of the time-based organization hierarchy is effective only for an other effective period defined by a second start date and a second end date, and
      the second start date falls after the first end date;
   receiving a sales data input corresponding to a transaction, wherein the transaction is associated with a transaction date of the transaction;
   assigning sales credit to the first position in response to a first corresponding assignment rule and the sales data input, if the transaction date of the transaction corresponds to the effective period;
   assigning sales credit to the second position in response to a second corresponding assignment rule and the sales data input, if the transaction date of the transaction corresponds to the other effective period;
   defining an achievement container definition to include an execution selection and an execution selection accumulation period in response to a third user input, the achievement container definition configured to create at least one achievement container with an execution selection date corresponding to the execution selection and the execution selection accumulation period;
   accumulating transaction data in the at least one achievement container; and compiling each achievement container corresponding to the position and an attainment period specified by a user in response to a monitoring request.

41. The machine-readable storage medium of claim 40, wherein the achievement container definition further includes a plan selection and a plan selection accumulation period, the achievement container definition further configured to create the at least one achievement container with a plan selection date corresponding to the plan selection and the plan selection accumulation period.

42. The machine-readable storage medium of claim 41, wherein the execution selection and the plan selection correspond to a status of the transaction, the status selected from a group comprising at least one of booked, invoiced, shipped, installed, and paid.

43. The machine-readable storage medium of claim 41, wherein the execution selection accumulation period and the plan selection accumulation period correspond to a calendar unit, the calendar unit selected from a group comprising at least one of daily, weekly, monthly, quarterly, and annually.

44. The machine-readable storage medium of claim 41, wherein execution of the instructions further performs the operations of:

generating a user interface by which a user may define at least one compensation plan in response to a fourth user input, the compensation plan including at least one position, a compensation plan effective period, a performance measure, a measure period, and an identification of a corresponding achievement container definition;

generating a user interface by which a user may specify a compensation period in response to a fifth user input;

identifying existing achievement containers having an execution selection date corresponding to the specified compensation period;

implementing the at least one compensation plan in response to a plan selection date corresponding to each identified achievement container; and compiling a result from each implemented compensation plan.

\* \* \* \* \*

UNITED STATES PATENT AND TRADEMARK OFFICE
CERTIFICATE OF CORRECTION

| | | |
|---|---|---|
| PATENT NO. | : 8,027,869 B2 | Page 1 of 1 |
| APPLICATION NO. | : 10/273632 | |
| DATED | : September 27, 2011 | |
| INVENTOR(S) | : Chang et al. | |

It is certified that error appears in the above-identified patent and that said Letters Patent is hereby corrected as shown below:

On sheet 9 of 12, in figure 12, Reference Numeral 1203, line 2, delete "CONTAINTER" and insert -- CONTAINER --, therefor.

On sheet 9 of 12, in figure 12, Reference Numeral 1205, line 1, delete "ACHIEVMENT" and insert -- ACHIEVEMENT --, therefor.

In column 10, line 65, delete "final" and insert -- Final --, therefor.

In column 16, line 49-57, delete "In addition to..............detail hereinafter." and insert the same on Col. 16, Line 50 as a new paragraph.

Signed and Sealed this
Third Day of January, 2012

David J. Kappos
*Director of the United States Patent and Trademark Office*